US009658762B2

(12) United States Patent
Park et al.

(10) Patent No.: US 9,658,762 B2
(45) Date of Patent: May 23, 2017

(54) MOBILE TERMINAL AND METHOD FOR CONTROLLING DISPLAY OF OBJECT ON TOUCH SCREEN

(71) Applicants: Samsung Electronics Co., Ltd., Suwon-si, Gyeonggi-do (KR); INDUSTRY-ACADEMIC COOPERATION FOUNDATION, YONSEI UNIVERSITY, Seoul (KR)

(72) Inventors: Jung-Hoon Park, Seoul (KR); Yong Gu Ji, Seoul (KR); So-Young Kim, Seoul (KR); Sung-Joo Ahn, Seoul (KR); Hwan Hwangbo, Seoul (KR); Hyo Chang Kim, Seoul (KR); Hyung Jun Oh, Seoul (KR); Hyun-Guk Yoo, Hwaseong-si (KR); Gyeong-Ho Chu, Daegu (KR)

(73) Assignees: Samsung Electronics Co., Ltd., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 350 days.

(21) Appl. No.: 14/188,098

(22) Filed: Feb. 24, 2014

(65) Prior Publication Data

US 2014/0245223 A1 Aug. 28, 2014

(30) Foreign Application Priority Data

Feb. 22, 2013 (KR) ........................ 10-2013-0019472

(51) Int. Cl.
 *G06F 3/048* (2013.01)
 *G06F 3/0488* (2013.01)
(52) U.S. Cl.
 CPC .. *G06F 3/0488* (2013.01); *G06F 2203/04803* (2013.01); *G06F 2203/04805* (2013.01)
(58) Field of Classification Search
 CPC ......... G06F 3/0488; G06F 2203/04803; G06F 2203/0222
 See application file for complete search history.

(56) References Cited

U.S. PATENT DOCUMENTS

| 5,760,773 | A  | * | 6/1998 | Berman | G06F 1/1626 345/672 |
| 7,721,226 | B2 | * | 5/2010 | Barabe | G06F 3/0482 715/708 |
| 8,201,109 | B2 | * | 6/2012 | Van Os | G06F 3/0488 715/710 |

(Continued)

FOREIGN PATENT DOCUMENTS

| JP | 2007-79947 A | 3/2007 |
| JP | 2008-72261 A | 3/2008 |

(Continued)

*Primary Examiner* — Omar Abdul-Ali
(74) *Attorney, Agent, or Firm* — Jefferson IP Law, LLP

(57) ABSTRACT

A method for controlling display of an object displayed on a touch screen in a mobile terminal is provided. The method includes displaying the object on the touch screen, generating an extension bar in response to a touch that is detected on the touch screen for a period of time, generating a zoom window in response to resizing of the extension bar, and zooming in and displaying content of the object in response to movement of the generated zoom window.

32 Claims, 18 Drawing Sheets

(56) References Cited

U.S. PATENT DOCUMENTS

| | | | |
|---|---|---|---|
| 8,497,882 B2* | 7/2013 | Kim | G06F 3/0488 345/661 |
| 2007/0275974 A1 | 11/2007 | Fanara et al. | |
| 2009/0048000 A1* | 2/2009 | Ade-Hall | G06F 3/0236 455/566 |
| 2010/0289757 A1* | 11/2010 | Budelli | G06F 3/04842 345/173 |
| 2012/0311437 A1* | 12/2012 | Weeldreyer | G06F 3/0488 715/252 |
| 2013/0042199 A1* | 2/2013 | Fong | G06F 3/0488 715/780 |
| 2014/0173473 A1* | 6/2014 | Hicks | G06F 3/04842 715/764 |

FOREIGN PATENT DOCUMENTS

| | | |
|---|---|---|
| KR | 10-2007-0043841 A | 4/2007 |
| KR | 10-2008-0098558 A | 11/2008 |
| KR | 10-2010-0121787 A | 11/2010 |

* cited by examiner

MOBILE TERMINAL AND METHOD FOR CONTROLLING DISPLAY OF OBJECT ON TOUCH SCREEN

CROSS-REFERENCE TO RELATED APPLICATION(S)

This application claims the benefit under 35 U.S.C. §119(a) of a Korean patent application filed on Feb. 22, 2013 in the Korean Intellectual Property Office and assigned Serial number 10-2013-0019472, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) INDUSTRY-ACADEMIC COOPERATION FOUNDATION, YONSEI UNIVERSITY

TECHNICAL FIELD

The present disclosure relates to a mobile terminal. More particularly, the present disclosure relates to a mobile terminal and method for controlling display of an object on a touch screen.

BACKGROUND

Recently, there is a gradual increase in the diversity of services and add-ons (or additional features) provided by mobile terminals. In order to increase the utility of the mobile terminals and satisfy a variety of needs of users, various applications executable in the mobile terminals have been developed.

Accordingly, a few to hundreds of applications may be stored in a mobile terminal such as a smart phone and a tablet Personal Computer (PC). Icons (also known as shortcut icons) for executing their associated applications may be displayed on a touch screen of the mobile terminal. Thus, a user may run his or her desired application on the mobile terminal by touching any one of the icons displayed on the touch screen. On the touch screen of the mobile terminal may be displayed various types of visual objects such as widgets, photos and documents, in addition to the shortcut icons.

However, due to the mobile terminal's narrow touch screen, the mobile terminal displays a smaller number of the icons than those displayed on the screen of, for example, desktop computers and laptop computers, and also may increase the difficulty of controlling the display of information, compared with desktop computers and laptop computers. For a user who has poorer vision s than the average user in terms of the viewing angle and eyesight, the small size of text on the mobile terminal's screen may make it difficult for the user with poor vision to read the text, thereby leading to limited accessibility to the mobile terminal. For this reason, measures are needed to improve the readability by resizing text in an object such as a web page and a document on the touch screen of the mobile terminal.

In other words, there is a need to increase the readability for users with poor vision by allowing the users to freely zoom in and out of text in an object displayed on a touch screen of a mobile terminal or by splitting a display screen on the touch screen.

Accordingly, there is a need for a mobile terminal and method for controlling display of an object on a touch screen by zooming in on text in an object in the mobile terminal equipped with at least one touch screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile terminal and method for controlling display of an object on a touch screen by zooming in on text in an object in the mobile terminal equipped with at least one touch screen.

In accordance with an aspect of the present disclosure, a method for controlling display of an object displayed on a touch screen in a mobile terminal is provided. The method includes displaying the object on the touch screen, generating an extension bar in response to a touch that is detected on the touch screen for a period of time, generating a zoom window in response to resizing of the extension bar, and zooming in and displaying content of the object in response to movement of the generated zoom window.

In accordance with another aspect of the present disclosure, a mobile terminal for controlling display of an object displayed on a touch screen is provided. The mobile terminal includes the touch screen configured to display the object, and a controller configured to generate an extension bar in response to a touch that is detected on the touch screen for a period of time, generate a zoom window in response to resizing of the extension bar, and zoom in and display content of the object in response to movement of the generated zoom window.

In accordance with further another aspect of the present disclosure, a method for controlling display of an object displayed on a touch screen in a mobile terminal is provided. The method includes displaying the object on the touch screen, splitting the touch screen into at least two touch screens in response to at least one of a touch that is detected on the touch screen for a period of time, and selection of a zoom window function, and displaying content corresponding to a zoom window on a first touch screen among the split touch screens, on a second touch screen.

In accordance with yet further another aspect of the present disclosure, a mobile terminal for controlling display of an object displayed on a touch screen is provided. The mobile terminal includes the touch screen configured to display the object, and a controller configured to split the touch screen into at least two touch screens in response to at least one of a touch that is detected on the touch screen for a period of time, and select a zoom window function, and display the content corresponding to a zoom window on a first touch screen among the split touch screens, on a second touch screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
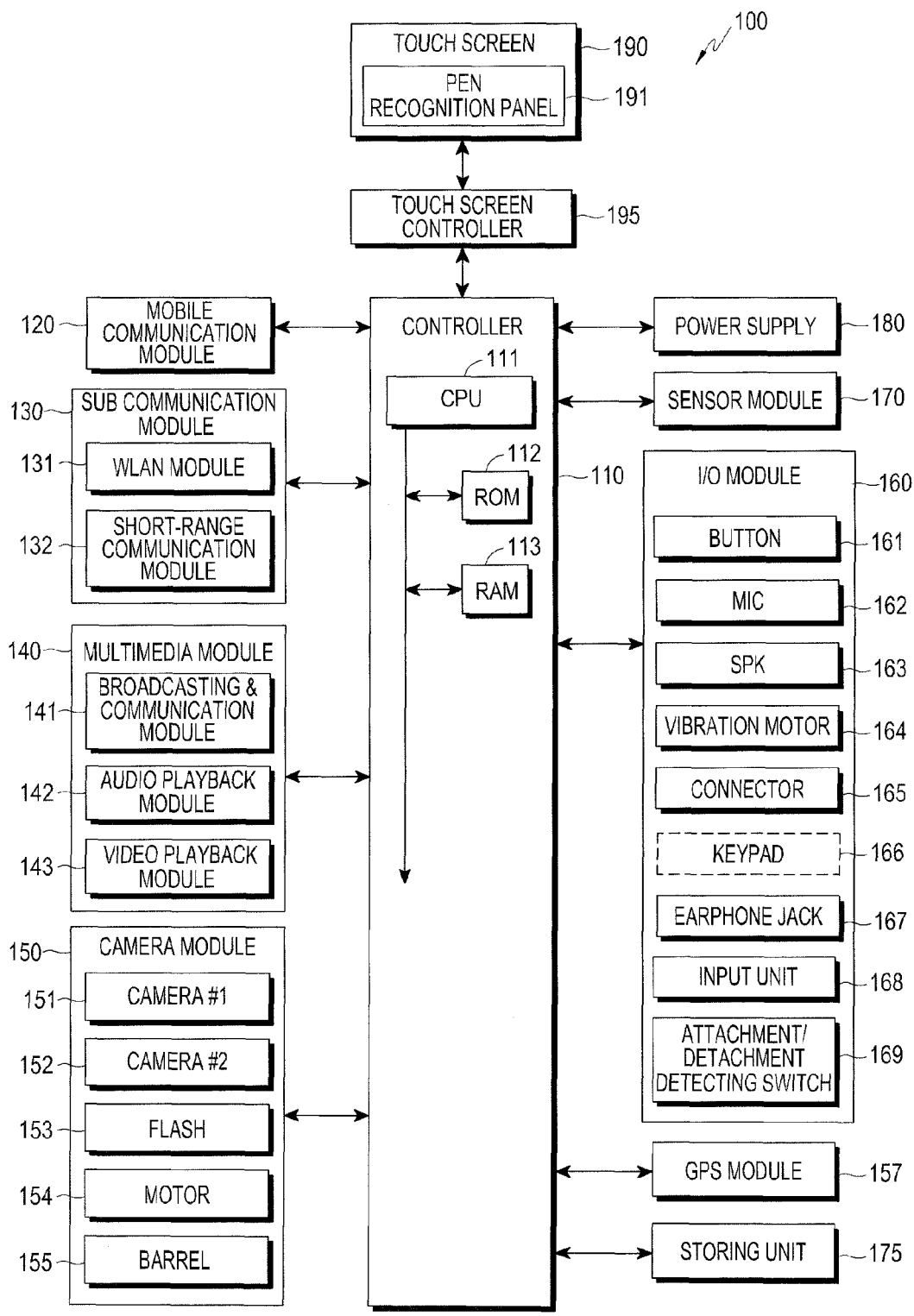
FIG. 1 is a schematic block diagram illustrating a mobile terminal providing haptic effects according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

First, the terms used herein will be defined as follows.

Mobile Terminal: A mobile terminal may refer to a mobile terminal which may be carried by a user and is capable of data transmission and reception and voice and video calls, and the mobile terminal may be equipped with one or two or more touch screens. The mobile terminal may include a smart phone, a tablet PC, a three-Dimensional (3D) TV, a smart TV, a Light Emitting Diode (LED) TV, a Liquid Crystal Display (LCD) TV and the like, and may also include any terminal that may communicate with peripheral devices or other terminals located in a remote area.

Input Unit: An input unit may include at least one of a finger(s), an electronic pen and a stylus pen that may provide a command or an input to a mobile terminal by the input unit's direct contact or indirect contact (such as hovering) with a touch screen.

Object: An object may refer to an object that is or may be displayed on a touch screen of a mobile terminal, and may include at least one of a document, a widget, a photo, a video, an E-mail, a notepaper, a Short Message Service (SMS) message, a Multimedia Messaging Service (MMS) message and the like. The object may be executed, deleted, canceled, stored and changed by an input unit. The object may also be construed to include a shortcut icon, a thumbnail image, and a folder in which a mobile terminal stores at least one object.

Icon (or Shortcut Icon): An icon may refer to an icon that is displayed on a touch screen of a mobile terminal, for fast execution of call, contact, menu and the like, which are provided by default in each application or the mobile terminal. If a command or an input for execution of an icon is entered, the icon's associated application may be executed.

FIG. 1 is a schematic block diagram illustrating a mobile terminal providing haptic effects according to an embodiment of the present disclosure.

Referring to FIG. 1, a mobile terminal 100 may be connected to external devices (not shown) using at least one of a mobile communication module 120, a sub-communication module 130, a connector 165, and an earphone jack 167. The external devices may include a variety of devices such as earphones, external speakers, Universal Serial Bus (USB) memories, chargers, cradles/docks, Digital Multimedia Broadcasting (DMB) antennas, mobile payment-related devices, healthcare devices (e.g., blood glucose meters and the like), game consoles, and car navigation devices, all of which may be detachably connected to the mobile terminal 100 by wires. The external devices may include Bluetooth devices, Near Field Communication (NFC) devices, WiFi Direct devices, wireless Access Points (APs) and the like, all of which may be wirelessly connected to the mobile terminal 100. The mobile terminal 100 may also be connected to other devices (e.g., cellular phones, smart phones, tablet PCs, desktop PCs and servers) by wires or wirelessly.

Referring to FIG. 1, the mobile terminal 100 may include at least one touch screen 190 and at least one touch screen controller 195. The mobile terminal 100 may also include a controller 110, the mobile communication module 120, the sub-communication module 130, a multimedia module 140, a camera module 150, a Global Positioning System (GPS) module 157, an Input/Output (I/O) module 160, a sensor module 170, a storage unit 175, and a power supply 180.

The sub-communication module 130 may include at least one of a Wireless Local Area Network (WLAN) module 131 and a short-range communication module 132, and the multimedia module 140 may include at least one of a broadcasting & communication module 141, an audio playback module 142 and a video playback module 143. The camera module 150 may include at least one of a first camera 151 and a second camera 152. Depending on the main purpose of the mobile terminal 100, the camera module 150 may include at least one of a barrel 155 for zooming in and out of the first and/or second cameras 151 and 152, a motor 154 for controlling movement of the barrel 155, for zoom in/out of the barrel 155, and a flash 153 for providing a light source for shooting. The I/O module 160 may include at least one button 161, a Microphone (MIC) 162, a Speaker (SPK) 163, a vibration motor 164, the connector 165, and a keypad 166.

The controller 110 may include a Central Processing Unit (CPU) 111, a Read Only Memory (ROM) 112 storing a control program for control of the mobile terminal 100, and a Random Access Memory (RAM) 113 that temporarily stores signals or data received from the outside of the mobile terminal 100, and is used as a workspace for operations performed in the mobile terminal 100. The CPU 111 may include a plurality of cores. For example, the CPU 111 may include a single-core CPU, a double-core CPU, a triple-core CPU, a quad-core CPU or the like. The CPU 111, the ROM 112 and the RAM 113 may be interconnected through an internal bus.

The controller 110 may control the mobile communication module 120, the sub-communication module 130, the multimedia module 140, the camera module 150, the GPS module 157, the I/O module 160, the sensor module 170, the storage unit 175, the power supply 180, the touch screen 190 and the touch screen controller 195.

The controller 110 may determine whether hovering is recognized as a touch input unit 168 such as an electronic pen approaches any one of multiple objects displayed on the touch screen 190, or may determine whether a touch by the input unit 168 is made on the touch screen 190. The controller 110 may detect a height (or gap) from the touch screen 190 to the input unit 168, and a hovering input corresponding to the height. In other words, the controller 110 may detect a hovering input that is made by the input unit 168 over the touch screen 190, or a touch input made by a touch by the input unit 168 on the touch screen 190.

The controller 110 may determine an event or movement of the input unit 168 on the touch screen 190 that displays at least one object, and control display of the results corresponding thereto on the touch screen 190. The controller 110 may activate the properties of an object that is selected in response to a function for changing a size of at least one object displayed on the touch screen 190, and may control a text (or content) size of the selected object on the touch screen 190. To this end, the controller 110 may detect a touch made by the user's finger or the input unit 168 on the touch screen 190. For example, the controller 110 may display an extension bar for enlarging or zooming in on the text, if the user's figure touches and holds text in an object for a specific time, and then is released from the text. The specific time may be determined in advance, and may correspond to a long touch (or long press) which is longer than a tab action that the user's finger makes a single touch on the screen.

The controller 110 may generate an extension bar in response to a touch that is detected on the touch screen 190 for a period of time, and generate a zoom window in response to resizing of the generated extension bar. The controller 110 may zoom in content of the object in response movement of the generated zoom window and display the zoomed-in content on the touch screen 190. The zoom window may include at least one Move button among a Move-Up button, a Move-Down button, a Move-Left button and a Move-Right button, and the controller 110 may zoom in and display content of the object in response to a touch on the Move button. The extension bar may be resized in at least one of up, down, left and right directions, and if a zoom button constituting the generated extension bar is selected, the controller 110 may change the extension bar to a zoom window, and display the zoom window on the touch screen 190. The controller 110 may zoom in and display content in the generated zoom window in a fixed position in response to movement by a touch of an object displayed on the touch screen 190. The controller 110 may control movement of the generated zoom window along with movement by a touch of an object displayed on the touch screen 190. If a touch is detected on an object displayed on the touch screen 190 in a portion other than the generated zoom window for a period of time, the controller 110 may move the generated zoom window to a point of the detected touch, and zoom in and display content in response to movement of the zoom window. In response to a touch input to a portion other than the generated extension bar and the generated zoom window, the controller 110 may release the generated extension bar and the generated zoom window.

Alternatively, the controller 110 may split the touch screen 190 into at least two touch screens in response to a touch that is detected on the touch screen 190 for a period of time, and display content corresponding to a zoom window on a first touch screen among the split touch screens, on a second touch screen.

The controller 110 may detect a touch input made on the touch screen 190, calculate a drag distance of the touch input, compare the drag distance with a preset threshold range, and control a page view of the touch screen 190 in response to the comparison results. For example, if the touch corresponds to a pinch-to-zoom-in or pinch-to-zoom-out gesture (which is a typical multi-touch gesture), the controller 110 may zoom in or out of text displayed on the touch screen 190. The controller 110 may zoom out a zoom window on the first touch screen upon detecting a pinch-to-zoom-in gesture on the second touch screen, and zoom in a zoom window on the first touch screen upon detecting a pinch-to-zoom-out on the second touch screen. The controller 110 may convert at least one touch screen into a keypad, if a text window is selected on at least one of the first touch screen and the second touch screen.

The mobile communication module 120, under control of the controller 110, may connect the mobile terminal 100 to the external devices by mobile communication using one or multiple antennas (not shown). The mobile communication module 120 may transmit and receive wireless signals for voice calls, video calls, SMS messages or MMS message, to and from cellular phones (not shown), smart points (not shown), tablet PCs (not shown) or other devices (not shown), phone numbers of all of which are entered or registered in the mobile terminal 100.

The sub-communication module 130 may include at least one of the WLAN module 131 and the short-range communication module 132. For example, the sub-communication module 130 may include any one or both of the WLAN module 131 and the short-range communication module 132.

The WLAN module 131, under control of the controller 110, may access the Internet in the place where a wireless AP (not shown) is installed. The WLAN module 131 may support the WLAN standard IEEE802.11x proposed by Institute of Electrical and Electronics Engineers (IEEE). The short-range communication module 132, under control of the controller 110, may enable wireless short-range communication between the mobile terminal 100 and an image forming apparatus (not shown). The image forming apparatus scheme may include Bluetooth, Infrared Data Association (IrDA), WiFi-Direct, NFC, and the like.

The controller 110 may transmit a control signal corresponding to a haptic pattern to the input unit 168 through any one of the WLAN module 131 and the short-range communication module 132 in the sub-communication module 130.

Depending on the mobile terminal's performance, the mobile terminal 100 may include at least one of the mobile communication module 120, the WLAN module 131, and the short-range communication module 132, or may include a combination thereof. In the present disclosure, at least one of or a combination of the mobile communication module 120, the WLAN module 131 and the short-range communication module 132 will be referred to as a transceiver, but it is not intended to limit the scope of the present disclosure.

The multimedia module 140 may include the broadcasting & communication module 141, the audio playback module 142, or the video playback module 143. The broadcasting & communication module 141, under control of the controller 110, may receive broadcast signals (e.g., TV broadcast signals, radio broadcast signals, or data broadcast signals) and additional broadcast information (e.g., Electric Program Guide (EPG) or Electric Service Guide (ESG)) sent from broadcasting stations via a broadcasting & communication antenna (not shown). The audio playback module 142, under control of the controller 110, may play digital audio files (with a file extension of, for example, mp3, wma, ogg or wav) stored in the storage unit 175 or received from the outside. The video playback module 143, under control of the controller 110, may play digital video files (with a file extension of, for example, mpeg, mpg, mp4, avi, mov, or mkv) stored in the storage unit 175 or received from the outside. The video playback module 143 may play digital audio files as well.

The multimedia module 140 may include the audio playback module 142 and the video playback module 143, excluding the broadcasting & communication module 141. The audio playback module 142 and the video playback module 143 in the multimedia module 140 may be incorporated into the controller 110.

The camera module 150 may include at least one of the first camera 151 and the second camera 152, which may capture or shoot still images or videos under control of the controller 110. The camera module 150 may further include at least one of the barrel 155 for performing zooming in and out to shoot a subject, the motor 154 for controlling movement of the barrel 155, and the flash 153 for providing secondary light source needed to shoot a subject. The first camera 151 may be disposed on the front of the mobile terminal 100, and the second camera 152 may be disposed on the rear of the mobile terminal 100. In an alternative way, the first camera 151 and the second camera 152 may be disposed adjacent to each other (with a gap therebetween set greater than 1 cm and less than 8 cm), to shoot 3D still images or videos.

The first and second cameras 151 and 152 may each include a lens system, an image sensor, and the like. The first and second cameras 151 and 152 may each convert an optical image signal received or captured through the lens system into an electrical image signal, and output the electrical image signal to the controller 110. The user may shoot videos or still images using the first and second cameras 151 and 152.

The GPS module 157 may receive radio waves from a plurality of GPS satellites (not shown) in Earth orbit, and calculate the location of the mobile terminal 100 based on Time of Arrival (ToA) from the GPS satellites to the mobile terminal 100.

The I/O module 160 may include at least one of the multiple buttons 161, the microphone 162, the speaker 163, the vibration motor 164, the connector 165, the keypad 166, the earphone jack 167, and the input unit 168. In addition, cursor control devices such as a mouse, a trackball, a joystick and cursor direction keys may be provided to the I/O module 160 to control movement of a cursor on the touch screen 190 through communication with the controller 110.

The buttons 161 may be formed or mounted on the front, side or rear of the housing of the mobile terminal 100, and may include at least one of a Power/Lock button (not shown), a Volume button (not shown), a Menu button (not shown), a Home button (not shown), a Back button (not shown), and a Search button (not shown).

The microphone 162, under control of the controller 110, may generate electrical audio signals by receiving or picking up vices or sounds.

The speaker 163, under control of the controller 110, may output sounds corresponding to a variety of signals (e.g., wireless signals, broadcast signals, digital audio files, digital video files, photo-shooting tones or the like) from the mobile communication module 120, the sub-communication module 130, the multimedia module 140 or the camera module 150, to the outside of the mobile terminal 100. The speaker 163 may output sounds corresponding to a control signal that is transmitted to the input unit 168 through the short-range communication module 132. The sounds corresponding to the control signal may include sounds corresponding to activation of a vibration motor 164 in the input unit 168, sounds whose strength varies in response to strength of vibrations, and sounds corresponding to inactivation of the vibration motor 164. For these sounds, their volume may be controlled depending on the vibration strength of the vibration motor 164 in the input unit 168, or the sounds may be output through the speaker 163 of the mobile terminal 100 and/or a speaker 163 mounted in the input unit 168, upon activation of the vibration motor 164 or a period of time (e.g., 10 ms) before or after the activation. The sounds may be terminated upon deactivation of the vibration motor 164, or a period of time (e.g., 10 ms) before or after the deactivation. The speaker 163 may output sounds (e.g., button manipulation tones or ring back tones for phone calls) corresponding to the functions executed by the mobile terminal 100. One or multiple speakers 163 may be mounted in a proper position or positions of the housing of the mobile terminal 100.

The vibration motor 164, under control of the controller 110, may convert electrical signals into mechanical vibrations. For example, upon receiving a voice call from another device (not shown), the mobile terminal 100 in a vibration mode may enable the vibration motor 164. One or multiple vibration motors 164 may be mounted in the housing of the mobile terminal 100. The vibration motor 164 may operate in response to the user's touch on the touch screen 190 and/or the continuous movement of the touch on the touch screen 190.

The connector 165 may be used as an interface for connecting the mobile terminal 100 to external devices (not shown) or power sources (not shown). The mobile terminal 100, under control of the controller 110, may transmit the data stored in the storage unit 175 to the external devices (not shown) or receive data from the external devices (not shown), via a wired cable connected to the connector 165. The mobile terminal 100 may receive power from a power source (not shown) or charge the mobile terminal 100's rechargeable battery (not shown) using the power source, via a wired cable connected to the connector 165.

The keypad 166 may receive key inputs from the user, for control of the mobile terminal 100. The keypad 166 may include a physical keypad (not shown) mounted on the mobile terminal 100 or a virtual keypad (not shown) displayed on the touch screen 190. The physical keypad mounted on the mobile terminal 100 may be optional depending on the performance or structure of the mobile terminal 100.

An earphone (not shown) may be inserted in the earphone jack 167 and connected to the mobile terminal 100. The input unit 168 may be kept inside the mobile terminal 100 after insertion, and pulled out or detached from the mobile terminal 100 during the mobile terminal 100's use. An attachment or detachment detecting switch 169 operating in response to attachment or detachment of the input unit 168 may be mounted in a specific region inside the mobile terminal 100, in which the input unit 168 is inserted, to provide a signal corresponding to the attachment/detachment of the input unit 168 to the controller 110. The attachment or detachment detecting switch 169 may be mounted in a specific region inside the mobile terminal 100, in which the input unit 168 is inserted, and may be in direct or indirect contact with the input unit 168 when the input unit 168 is inserted in the mobile terminal 100. Accordingly, based on the direct or indirect contact with the input unit 168, the attachment or detachment detecting switch 169 may generate a signal corresponding to the attachment or detachment of the input unit 168, and provide the signal to the controller 110.

The sensor module 170 may include at least one sensor for detecting a state of the mobile terminal 100. For example, the sensor module 170 may include at least one of a proximity sensor (not shown) for detecting the user's proximity to the mobile terminal 100, an luminance sensor (not shown) for detecting the amount of ambient light of the mobile terminal 100, a motion sensor (not shown) for detecting motions (e.g., rotation, acceleration or vibration) of the mobile terminal 100, a geo-magnetic sensor (not shown) for detecting the point-of-the compass using the Earth's magnetic field, a gravity sensor for detecting a direction of the gravity, and an altimeter for detecting an altitude by measuring the atmospheric pressure. At least one sensor may detect a state of the mobile terminal 100, generate a signal corresponding to the detection, and provide the signal to the controller 110. Sensors for the sensor module 170 may be added or removed depending on the performance or structure of the mobile terminal 100.

The storage unit 175, under control of the controller 110, may store the signals or data which are input and output in response to operations of the mobile communication module 120, the sub-communication module 130, the multimedia module 140, the camera module 150, the GPS module 157, the I/O module 160, the sensor module 170, and the touch screen 190. The storage unit 175 may store a control program for control of the mobile terminal 100 or the controller 110, and a variety of applications.

If the user makes a temporary touch or a continuous touch on the touch screen 190 using the input unit 168, the storage unit 175 may store information about the vibration strength and vibration period corresponding to a haptic pattern for providing various haptic patterns to the input unit 168 or the mobile terminal 100.

The term 'storage unit' may be construed to include the storage unit 175, the ROM and the RAM 113 in the controller 110, or a memory card (not shown) (e.g., a Secure Digital (SD) card, a memory stick or the like) mounted in the mobile terminal 100. The storage unit may include a non-volatile memory, a volatile memory, a Hard Disk Drive (HDD), or a Solid State Drive (SSD).

The storage unit 175 may store applications of various features such as navigation, video call, game and tune-based alarm applications; images for providing Graphical User Interfaces (GUIs) related to the applications; databases or data related to user information, documents, and ways to handle touch inputs; background images (e.g., menu screens, standby screens and the like) or operational programs needed to drive the mobile terminal 100; or images captured by the camera module 150. The storage unit 175 may be machine (e.g., computer-readable media), and the term 'machine-readable media' may be defined as media that provide data to a machine so that the machine may perform a specific function. The machine-readable media may be storage media. The storage unit 175 may include non-volatile media and volatile media. All of the media need to be configured such that commands carried by the media may be detected by a physical mechanism that reads out the commands with the machine.

The machine-readable media may include, though not limited to, at least one of floppy disk, flexible disk, hard disk, magnetic tape, Compact Disc Read-Only Memory (CD-ROM), optical disk, punch card, paper tape, RAM, Programmable Read-Only Memory (PROM), Erasable PROM (EPROM), and FLASH-EPROM.

The power supply 180, under control of the controller 110, may supply power to one or multiple rechargeable batteries (not shown) mounted in the housing of the mobile terminal 100. The one or multiple rechargeable batteries may supply power to the mobile terminal 100. The power supply 180 may supply, to the mobile terminal 100, the power that is received from the external power source (not shown) via a wired cable connected to the connector 165. Alternatively, the power supply 180 may supply, to the mobile terminal 100, the power that is wirelessly received from the external power source by wireless charging technology.

The mobile terminal 100 may include at least one touch screen 190 that provides user interfaces corresponding to various services (e.g., call, data transmission, broadcasting, and photo shooting services), for the user. Each touch screen 190 may provide an analog signal corresponding to at least one touch input made on a user interface, to touch screen 190's associated touch screen controller 195. As such, the mobile terminal 100 may include a plurality of touch screens, and may also include a plurality of touch screen controllers that receive analog signals corresponding to their associated touch screens. The multiple touch screens may be connected to or mounted on their associated housings by hinges, or may be mounted on a single housing without hinges. The mobile terminal 100 according to an embodiment of the present disclosure may include at least one touch screen as described above, and in the following description, the mobile terminal 100 may be assumed to include a single touch screen 190, for convenience of description.

The touch screen 190 may receive at least one touch input by the user's body (e.g., fingers, including the thumb) or the touch input unit (e.g., a stylus pen or an electronic pen) 168. The touch screen 190 may include a pen recognition panel 191 that recognizes an input made by a pen such as a stylus pen and an electronic pen. The pen recognition panel 191 may recognize a distance or gap between the pen and the touch screen 190 by a magnetic field. The touch screen 190 may receive a continuous movement input for at least one touch. The touch screen 190 may transfer an analog signal corresponding to the received continuous movement input for a touch to the touch screen controller 195.

The term 'touch' as used herein may include not only contact touch (or direct contact) between the touch screen 190 and the user's body or the touch input unit 168, but also non-contact touch (or indirect contact) between the touch screen 190 and the user's body or the touch input unit 168, with a detectable gap therebetween set to, for example, 5 mm or less. The gap at which the touch screen 190 may detect the user's body or the input unit 168 may vary depending on the performance or structure of the mobile terminal 100, and the touch screen 190 may be configured to differently output the values (e.g., analog voltage values or current values) detected by a touch event and a hovering event, so as to separately detect the touch event by the contact touch with the user's body or the touch input unit 168, and the hovering event by the non-contact touch with the user's body or the touch input unit 168. In addition, the touch screen 190 may differently output the detected values (e.g., current values) depending on the distance between the touch screen 190 and the space where the hovering event occurs.

The touch screen 190 may be implemented in, for example, a resistive type, a capacitive type, an infrared type, or an acoustic wave type.

The touch screen 190 may include at least two touch screen panels that may detect a touch or proximity on or to the touch screen 190 by the user's body and the touch input unit 168, respectively, so as to sequentially or simultaneously receive the inputs by the user's body and the touch input unit 168. The at least two touch screen panels may provide different output values to the touch screen controller 195, and the touch screen controller 195 may differently recognize the values received from the at least two touch screen panels to determine whether an input from the touch screen 190 may be an input by the user's body or an input by the touch input unit 168.

More specifically, the touch screen 190 may be configured in a structure in which a panel for detecting an input by the finger or the input unit 168 based on a change in induced electromotive force, and a panel for detecting a contact with the touch screen 190 by the finger or the input unit 168 are sequentially stacked to be in contact with each other or partially spaced apart from each other. The touch screen 190 may include a plurality of pixels, and display images on the pixels. The touch screen 190 may use, as a display panel, a Liquid Crystal Display (LCD) panel, an Organic Light Emitting Diodes (OLED) panel, a Light Emitting Diodes (LED) panel, and the like.

The touch screen 190 may include a plurality of sensors for detecting the position where the finger or the input unit 168 is in contact with the surface of touch screen 190, or is placed over the touch screen 190 within a specific distance. Each of the plurality of sensors may be formed in a coil structure, and in a sensor layer formed of a plurality of sensors, the sensors may have preset patterns and form a plurality of electrode lines. In this structure, if a contact with the touch screen 190 is made by the finger or the input unit 168, a detection signal whose waveforms are changed may be generated due to a change in capacitance between the sensor layer and the input means (or input unit 168), and the touch screen 190 may transfer the generated detection signal to the controller 110. The specific gap between the input unit 168 and the touch screen 190 may be determined based on the strength of a magnetic field formed by a coil 510 in the input unit 168.

The touch screen controller 195 may convert an analog signal received from the touch screen 190 into a digital signal (e.g., X and Y coordinates), and provide the digital signal to the controller 110. The controller 110 may control the touch screen 190 based on the digital signal received from the touch screen controller 195. For example, the controller 110 may select or execute a shortcut icon (not shown) or an object displayed on the touch screen 190 in response to a touch event or a hovering event. The touch screen controller 195 may be incorporated into the controller 110.

In addition, the touch screen controller 195 may determine a gap between the touch screen 190 and the space where a hovering even occurs, by detecting the values (e.g., current values) output from the touch screen 190, convert a value of the determined gap into a digital signal (e.g., Z coordinates), and provide the digital signal to the controller 110.

Figure 2:
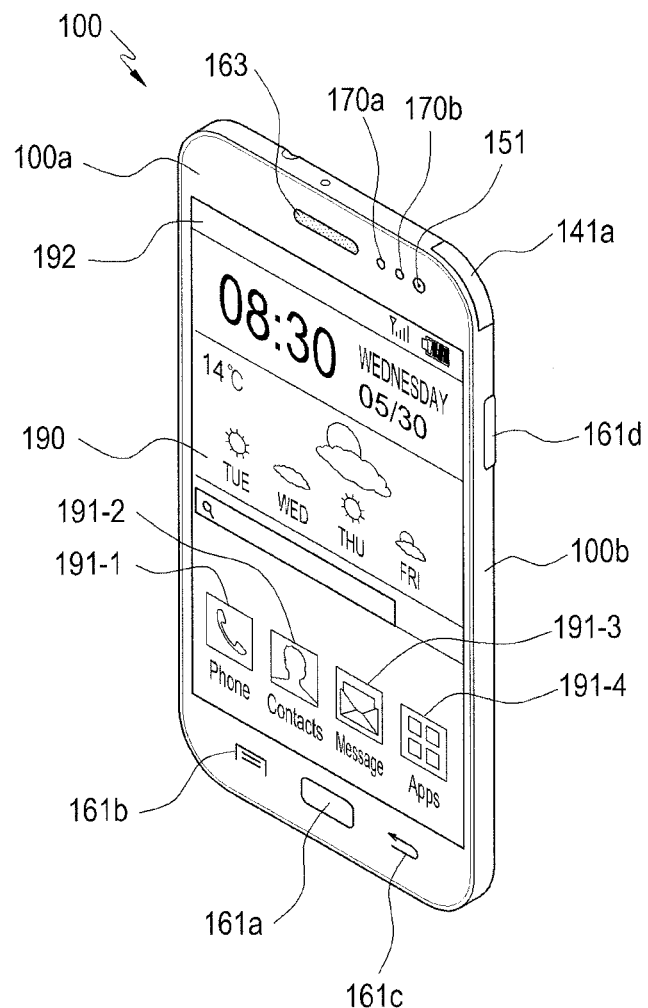
FIG. 2 is a front perspective view of a mobile terminal according to an embodiment of the present disclosure.
Figure 3:
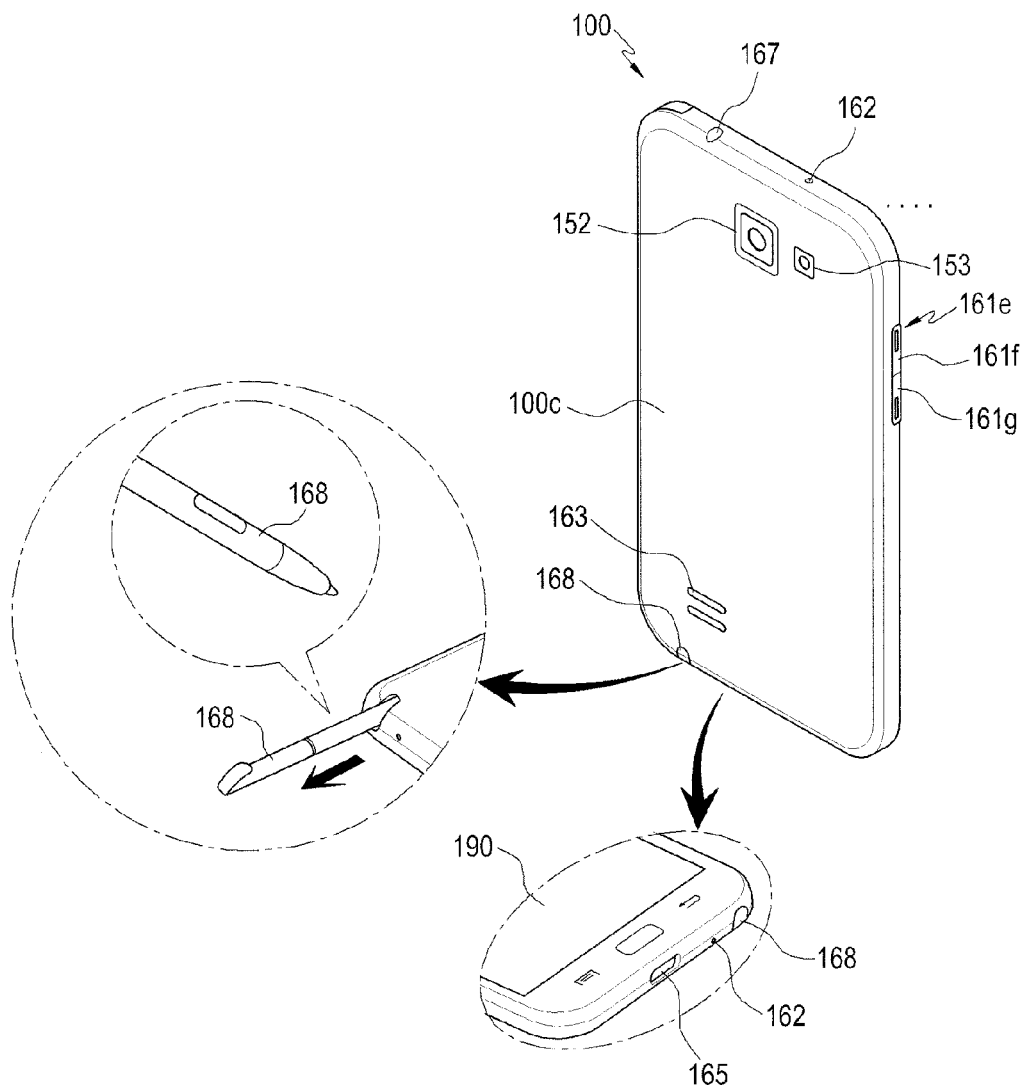
FIG. 3 is a rear perspective view of a mobile terminal according to an embodiment of the present disclosure.

FIG. 2 is a front perspective view of a mobile terminal according to an embodiment of the present disclosure, and FIG. 3 is a rear perspective view of a mobile terminal according to an embodiment of the present disclosure.

Referring to FIGS. 2 and 3, the touch screen 190 may be disposed in the center of a front 100a of the mobile terminal 100. The touch screen 190 may be formed large enough to occupy most of the front 100a of the mobile terminal 100. In the example of FIG. 2, a main home screen is displayed on the touch screen 190. The main home screen may be the first screen that is displayed on the touch screen 190 when the mobile terminal 100 is powered on. If the mobile terminal 100 has different home screens of several pages, the main home screen may be the first home screen among the home screens of several pages. On the main home screen may be displayed shortcut icons 191-1, 191-2 and 191-3 for executing frequently used applications, a Main Menu Switch key (also known as an Apps key) 191-4, the current time, the weather and the like. The Main Menu Switch key 191-4 may be used to display a menu screen on the touch screen 190. At the top of the touch screen 190 may be displayed a status bar 192 indicating states of the mobile terminal 100, such as a battery level, a received signal strength and the current time.

Under the touch screen 190 may be formed a Home button 161a, a Menu button 161b and a Back button 161c.

The Home button 161a may be used to display the main home screen on the touch screen 190. For example, if the Home button 161a is touched while any home screen other than the main home screen, or a menu screen is displayed on the touch screen 190, the main home screen may be displayed on the touch screen 190. If the Home button 161a is touched while applications are executed on the touch screen 190, the main home screen shown in FIG. 2 may be displayed on the touch screen 190. In addition, the Home button 161a may be used to display recently used applications on the touch screen 190, or used to display or execute a task manager.

The Menu button 161b may be used to provide connection menus that may be used on the touch screen 190. The connection menus may include an Add Widget menu, a Change Wallpaper menu, a Search menu, an Edit menu, a Preferences menu, an Edit Icon menu, and the like.

The Back button 161c may be used to display the screen preceding the current screen, or to exit the most recently used application.

On edges of the front 100a of the mobile terminal 100 may be disposed the first camera 151, a luminance sensor 170a and a proximity sensor 170b. On a rear 100c of the mobile terminal 100 may be disposed the second camera 152, the flash 153 and the speaker 163.

On sides 100b of the mobile terminal 100 may be disposed, for example, a Power or Rest button 161d, a Volume button 161e (with a Volume Up button 161f and a Volume Down button 161g), a terrestrial DMB antenna 141a for broadcast reception, and one or multiple microphones 162. The DMB antenna 141a may be detachably fixed to the mobile terminal 100.

The connector 165 may be formed in the bottom side of the mobile terminal 100. A plurality of electrodes may be formed in the connector 165 and connected to external devices by wires. The earphone jack 167 may be formed in the top side of the mobile terminal 100. An earphone may be inserted in the earphone jack 167.

The input unit 168 may be mounted in the bottom side of the mobile terminal 100. The input unit 168 may be kept inside the mobile terminal 100 after insertion, and pulled out or detached from the mobile terminal 100 during use of mobile terminal 100.

Figure 4:
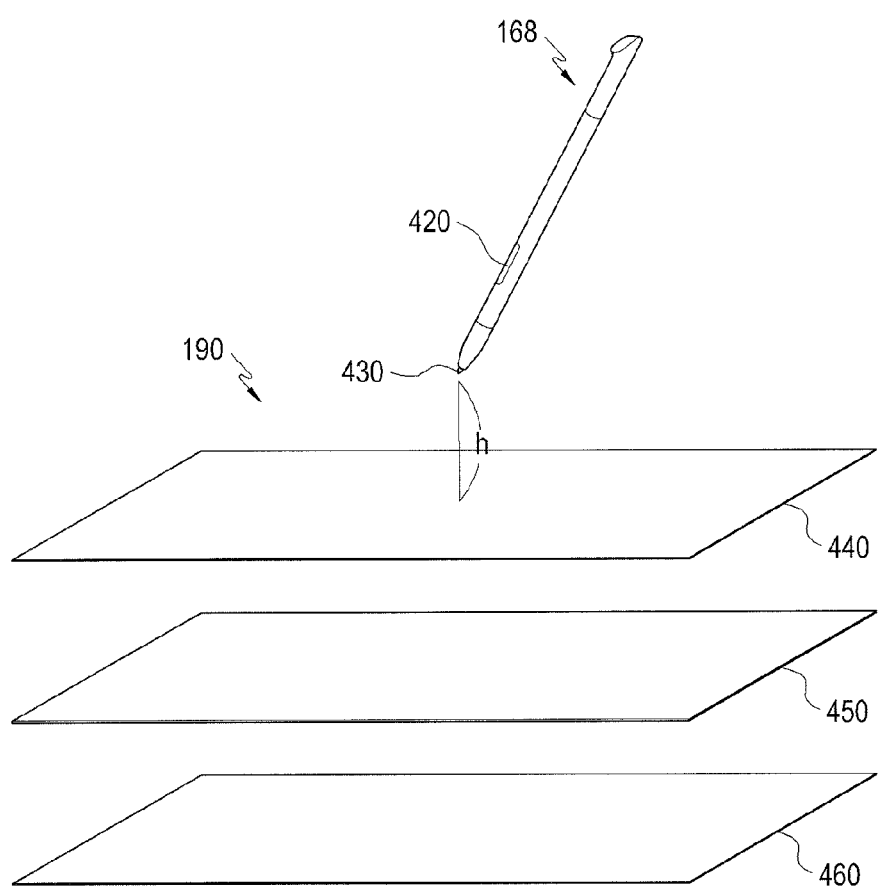
FIG. 4 illustrates an internal cross section of an input unit and a touch screen according to an embodiment of the present disclosure.

FIG. 4 illustrates an internal cross section of an input unit and a touch screen according to an embodiment of the present disclosure.

Referring to FIG. 4, the touch screen 190 may include a display panel 450, a first touch panel 440 and a second touch panel 460. The display panel 450 may be a panel such as an LCD panel and an Active Mode OLED (AMOLED) panel, and may display various operating states of the mobile terminal 100, various images corresponding to the executions and services of applications, and a plurality of objects.

The first touch panel 440, a capacitive touch panel, may be a panel that is coated with dielectric to store charges so that a current may flow on the surface of a glass, by coating both sides of the glass with a thin metallic conductive material (e.g., an Indium Tin Oxide (ITO) film). If the surface of the first touch panel 440 is touched by an input means (e.g., the user's finger or the stylus pen), a specific amount of charges may move to the touch position due to the static electricity, and the first touch panel 440 may detect the touch position by recognizing a change in current due to the movement of charges. The first touch panel 440 may detect all types of touches that may cause static electricity, and may detect the touches made by both of the finger and the stylus pen, which are input means.

The second touch panel 460, an Electronic Magnetic Resonance (EMR) touch panel, may include an electromagnetic induction coil sensor (not shown) having a grid structure in which a plurality of loop coils are disposed in a first direction and a second direction crossing the first direction, and an electronic signal processor (not shown) that sequentially provides an Alternating Current (AC) signal having a configurable frequency to the loop coils in the electromagnetic induction coil sensor. If the input unit 168 with a built-in resonance circuit exists in the vicinity of the loop coils in the second touch panel 460, a magnetic field sent from a relevant loop coil may cause a current that is based on mutual electromagnetic induction, in the resonance circuit in the input unit 168. Based on the current, an induced magnetic field may occur from the coil (not shown) constituting the resonance circuit in the input unit 168, and the second touch panel 460 may detect the induced magnetic field from the loop coil that is in a signal receiving state, so as to detect a hovering position and a touch position of the input unit 168, allowing the mobile terminal 100 to detect a height 'h' from the first touch panel 440 to a penpoint 430 of the input unit 168. It will be apparent to those of ordinary skill in the art that the height 'h' from the first touch panel 440 of the touch screen 190 to the penpoint 430 may vary depending on the configuration or structure of the mobile terminal 100. The second touch panel 460 may detect a hovering input and a touch input by the input unit 168 that may generate a current that is based on electromagnetic induction, and the second touch panel 460 will be assumed to be used to dedicatedly detect a hovering input and a touch input made by the input unit 168. The input unit 168 may also be referred to as an electromagnetic pen or an EMR pen. The input unit 168 may be different from the normal pen that does not include a resonance circuit which is detected by the first touch panel 440. The input unit 168 may be configured to include a button 420 that may change a value of electromagnetic induction occurring by a coil that is disposed inside a penholder in a region adjacent to the penpoint 430. The input unit 168 will be described in more detail below with reference to FIG. 5.

The touch screen controller 195 may include a first touch panel controller and a second touch panel controller. The first touch panel controller may convert an analog signal received from the first touch panel 440 and obtained by detecting a touch by the finger or pen, into a digital signal (e.g., X, Y and Z coordinates), and provide the digital signal to the controller 110. The second touch panel controller may convert an analog signal received from the second touch panel 460 and obtained by detecting hovering or touch by the input unit 168, into a digital signal, and provide the digital signal to the controller 110. The controller 110 may control the display panel 450, the first touch panel 440 and the second touch panel 460, using the digital signals received from the first and second touch panel controllers. For example, the controller 110 may display a shape of a screen on the display panel 450 in response to hovering or touch by the finger, the pen or the input unit 168.

In the mobile terminal 100 according to an embodiment of the present disclosure, the first touch panel 440 may detect a touch by the user's finger or the pen, and the second touch panel 460 may detect hovering or touch by the input unit 168. Therefore, the controller 110 of the mobile terminal 100 may separately detect a touch by the user's finger or the pen, and hovering or touch by the input unit 168. Although a single touch screen is considered in FIG. 4, the present disclosure is not limited to a single touch screen, and may be applied to multiple touch screens. The multiple touch screens may be connected to or mounted on their associated housings by hinges, or may be mounted on a single housing without hinges. Each of the multiple touch screens may be configured to include a display panel and at least one touch panel, as illustrated in FIG. 4.

Figure 5:
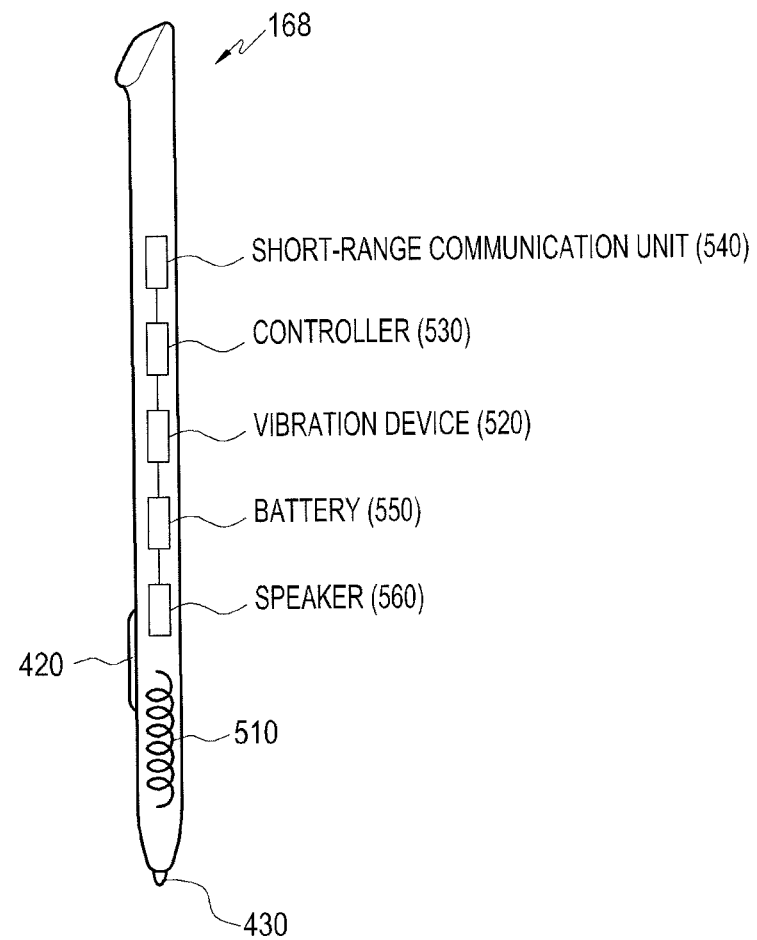
FIG. 5 is a block diagram illustrating an input unit providing haptic effects according to an embodiment of the present disclosure.

FIG. 5 is a block diagram illustrating an input unit providing haptic effects according to an embodiment of the present disclosure.

Referring to FIG. 5, the input unit (or a touch pen) 168 according to an embodiment of the present disclosure may include a penholder, the penpoint 430 disposed at an end of the penholder, the button 420 that may change a value of electromagnetic induction occurring by the coil 510 that is disposed inside the penholder in a region adjacent to the penpoint 430, the vibration device 520 that vibrates upon occurrence of a hovering input, a controller 530 for analyzing a control signal that is received from the mobile terminal 100 due to hovering over the touch screen 190, and for controlling the vibration strength and vibration period of the vibration device 520 to provide haptic effects to the input unit 168, a short-range communication unit 540 for performing short-range communication with the mobile terminal 100, and a battery 550 for supplying power for vibration of the input unit 168. The input unit 168 may further include the speaker 560 for outputting sounds corresponding to the vibration period and/or vibration strength of the input unit 168. The speaker 560 may output sounds corresponding to the haptic effects provided by the input unit 168 upon occurrence of the sounds by the speaker 163 mounted in the mobile terminal 100, or a period of time (e.g., 10 ms) before or after the occurrence of the sounds.

More specifically, the speaker 560, under control of the controller 530, may output sounds corresponding to various signals (e.g., wireless signals, broadcast signals, digital audio files, digital video files or the like) from the mobile communication module 120, the sub-communication module 130 or the multimedia module 140 provided in the mobile terminal 100. The speaker 560 may output sounds (e.g., button manipulation tones or ring back tones for phone calls) corresponding to the functions executed by the mobile terminal 100. One or multiple speakers 560 may be mounted in a proper position or positions of the housing of the input unit 168.

If the penpoint 430 is in contact with the touch screen 190 or is placed in the position where hovering may be detected, the controller 530 may analyze at least one control signal that is received from the mobile terminal 100 through the short-range communication unit 540, and control the vibration period and vibration strength of the vibration device 520 provided in the input unit 168 in response to the analyzed control signal. The short-range communication unit 540 and the vibration device 520 may be activated before a control signal is received. The control signal, which is a signal transmitted by the mobile terminal 100, may be periodically or aperiodically received from the mobile terminal 100 for a period of time or until a touch by the input unit 168 on a character or a picture is ended. For example, if the user touches the touch screen 190 with the penpoint 430 to enter a character or draw a picture, the mobile terminal 100 may transmit a control signal including each of a pen-specific haptic pattern and a material-specific haptic pattern, to the input unit 168, or may transmit a control signal including a combined haptic pattern of a pen-specific haptic pattern and a material-specific haptic pattern, to the short-range communication unit 540 provided in the input unit 168.

The control signal may be transmitted to the input unit 168 by at least one of the mobile communication module 120 and the sub-communication module 130 in the mobile terminal 100. The control signal may include at least one of information for activating the vibration device 520 in the input unit 168, information indicating vibration strength of the input unit 168, information for deactivating the vibration device 520 in the input unit 168, and information indicating the total time for which the haptic effects are provided. The control signal may have a length of about 8 bits and may be repeatedly transmitted at intervals of a period of time (e.g., 5 ms), to control vibration of the input unit 168, allowing the user to recognize that vibrations corresponding to the haptic effects are repeatedly generated at regular intervals. For example, the control signal may include information given in the following Table 1.

TABLE 1

| Field | Vibration device activated | Vibration strength | Vibration device deactivated |
|---|---|---|---|
| Info | 1 | 125 125 131 131 0 | 2 |

As illustrated in Table 1, the control signal may include information for activating the vibration device 520 in the input unit 168, information indicating vibration strength of the input unit 168, and information for deactivating the vibration device 520 in the input unit 168. Although the control signal may be transmitted to the input unit 168 at intervals of 5 ms, this is a mere example and the control signal may be variably transmitted depending on the period of the haptic pattern. The transmission period, vibration strength and transmission duration of the control signal are also variable. The transmission period, vibration strength and transmission duration may be different depending on the type of the pen and/or the type of the material. The transmission duration may be a period until a temporary touch or a continuous touch on the touch screen 190 by the input unit 168 is ended.

The aforesaid input unit 168 may be configured to support electrostatic induction. If a magnetic field is formed in a specific point of the touch screen 190 by the coil 510, the touch screen 190 may recognize the touch point by detecting the position of the magnetic field.

Figure 6:
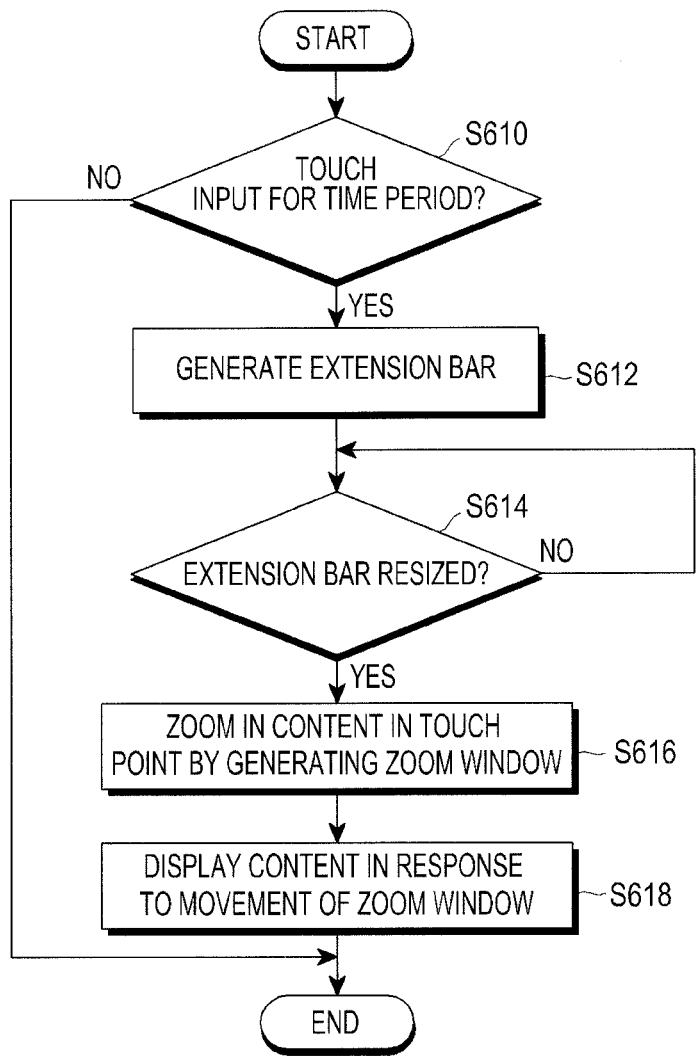
FIG. 6 is a flowchart illustrating a process of controlling display of an object displayed on a touch screen according to an embodiment of the present disclosure.

FIG. 6 is a flowchart illustrating a process of controlling display of an object displayed on a touch screen according to an embodiment of the present disclosure, and FIGS. 7A to 7G illustrate a process of controlling display of an object displayed on a touch screen according to an embodiment of the present disclosure.

Figures 7A, 7B:
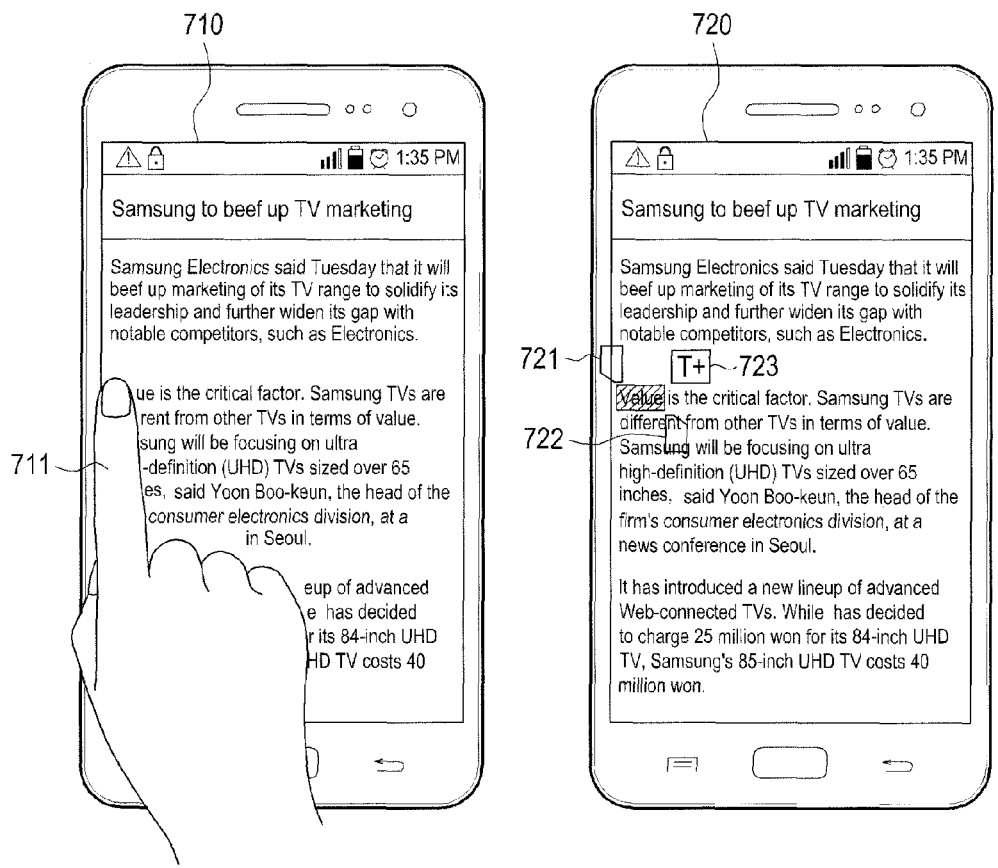
FIG. 7A illustrates an example of displaying an object including text on a touch screen according to an embodiment of the present disclosure.
FIG. 7B illustrates an example of generating an extension bar by touching an object including text on a touch screen according to an embodiment of the present disclosure.
Figure 7C:
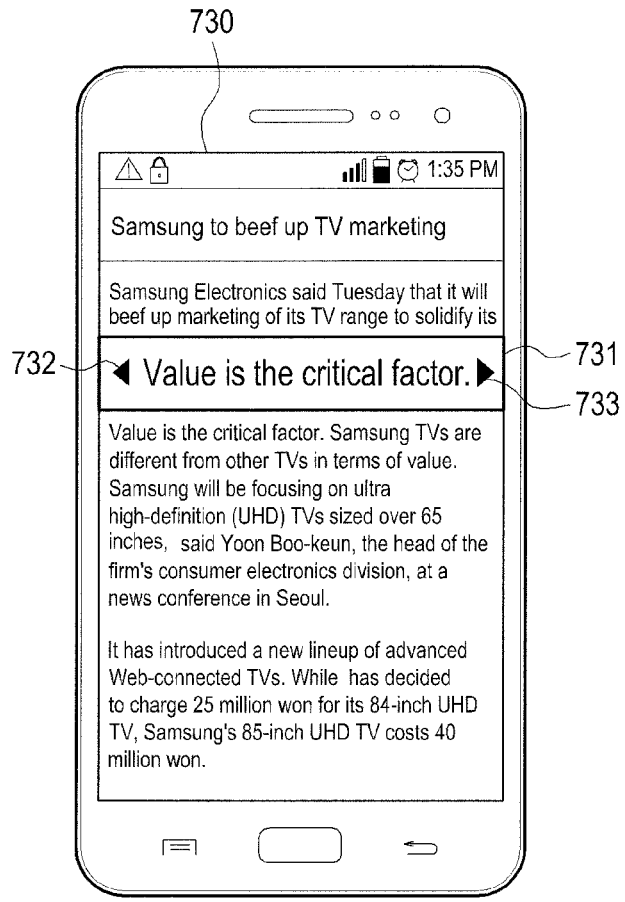
FIG. 7C illustrates an example of zooming in text by generating a zoom window by resizing an extension bar generated on a touch screen according to an embodiment of the present disclosure.
Figure 7D:
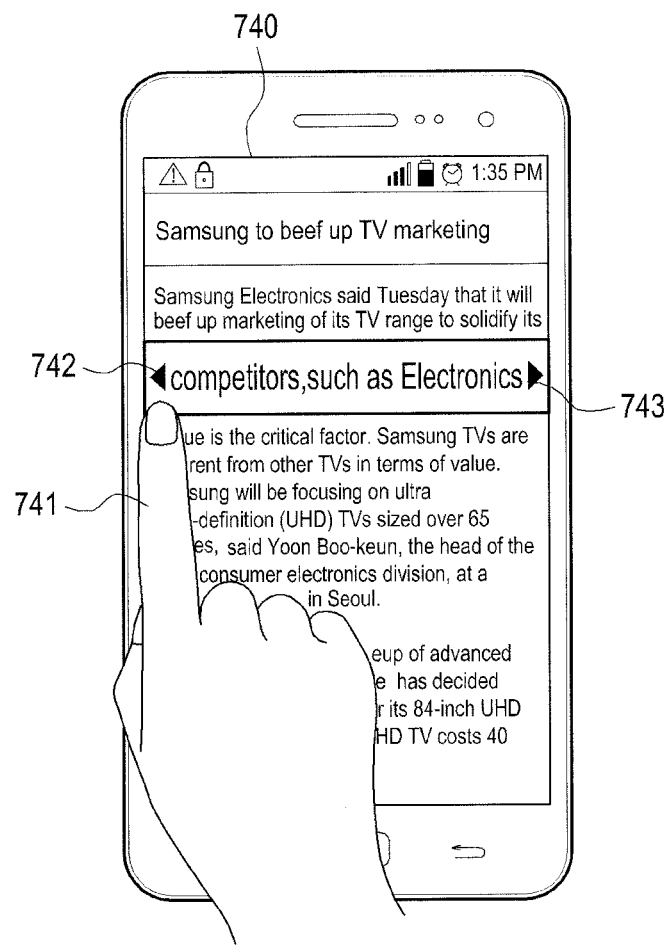
FIG. 7D illustrates an example of selecting a Move button on the left side of a zoom window displayed on a touch screen according to an embodiment of the present disclosure.
Figure 7E:
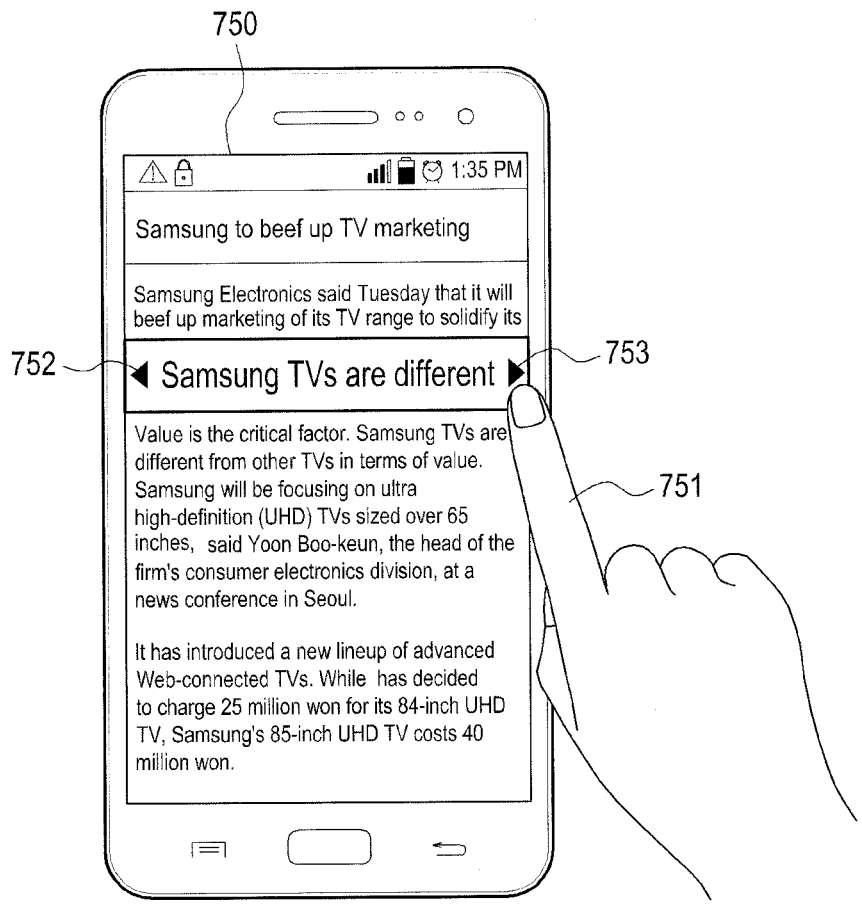
FIG. 7E illustrates an example of selecting a Move button on the right side of a zoom window displayed on a touch screen according to an embodiment of the present disclosure.
Figure 7F:
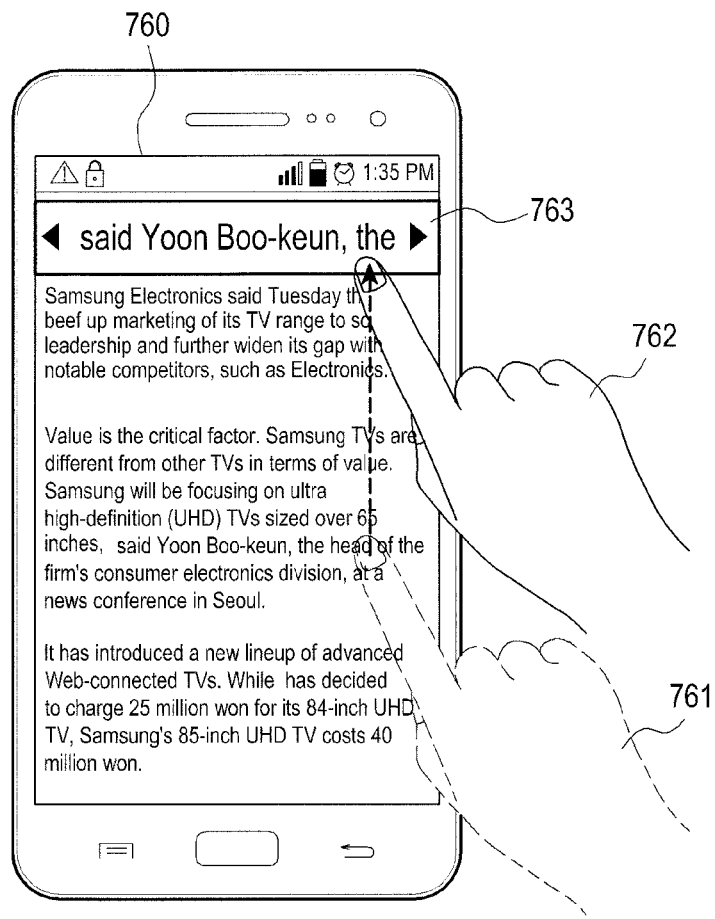
FIG. 7F illustrates an example of lifting up a zoom window displayed on a touch screen according to an embodiment of the present disclosure.
Figure 7G:
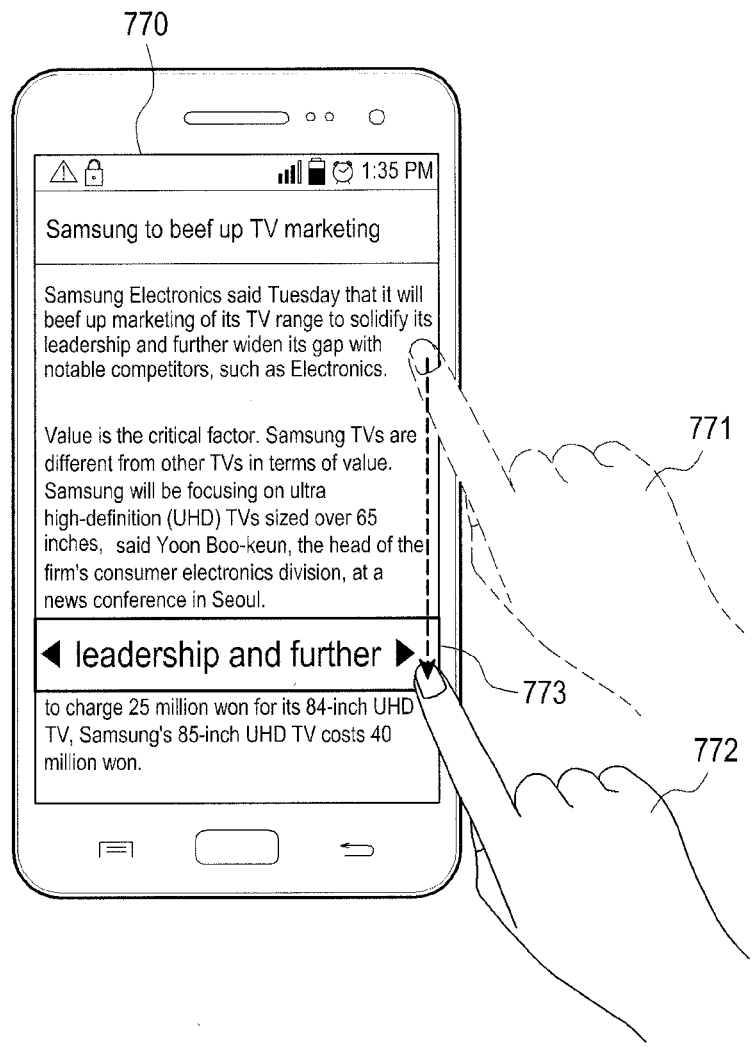
FIG. 7G illustrates an example of pulling down a zoom window displayed on a touch screen according to an embodiment of the present disclosure.

Specifically, FIG. 7A illustrates an example of displaying an object including text on a touch screen according to an embodiment of the present disclosure. FIG. 7B illustrates an example of generating an extension bar by touching an object including text on a touch screen according to an embodiment of the present disclosure. FIG. 7C illustrates an example of zooming in text by generating a zoom window by resizing an extension bar generated on a touch screen according to an embodiment of the present disclosure. FIG. 7D illustrates an example of selecting a Move button on the left side of a zoom window displayed on a touch screen according to an embodiment of the present disclosure. FIG. 7E illustrates an example of selecting a Move button on the right side of a zoom window displayed on a touch screen according to an embodiment of the present disclosure. FIG. 7F illustrates an example of lifting up a zoom window displayed on a touch screen according to an embodiment of the present disclosure. FIG. 7G illustrates an example of pulling down a zoom window displayed on a touch screen according to an embodiment of the present disclosure.

Reference will now be made to FIGS. 6 and 7A to 7G to describe in detail a process of controlling display of an object displayed on a touch screen according to an embodiment of the present disclosure.

If a touch is made on a touch screen for a period of time at operation S610, the controller 110 may generate an extension bar and display the extension bar on the touch screen at operation S612. The generated extension bar may be resized in at least one of the up, down, left and right directions, and may be changed to a zoom window if a Zoom button constituting the generated extension bar is selected.

If the extension bar generated in operation S612 is resized at operation S614, the controller 110 may generate a zoom window and zoom in content in the touch point at operation S616. The generated zoom window may include at least one Move button among a Move-Up button, a Move-Down button, a Move-Left button and a Move-Right button, and the controller 110 may zoom in and display content of the object in response to a touch on the Move button. As for the zoom window, the controller 110 may zoom in and display content in a fixed position in response to movement by a touch of an object displayed on the touch screen. The zoom window may be moved along with movement by a touch of an object displayed on the touch screen. The generated extension bar and zoom window may be released, if a touch is made on the displayed object in a portion other than the generated zoom window and extension bar.

The controller 110 may display the content in response to movement of the zoom window at operation S618. The zoom window may be moved in at least one of the up, down, left and right directions, or may be moved by a plurality of buttons provided in the zoom window while text displayed in the zoom window is zoomed in.

Referring to FIG. 7A, if a touch is made by a finger 711 or the input unit 168 while an object including texts such as a newspaper article and a document is displayed on a touch screen 710, the controller 110 may detect the touch and generate an extension bar as illustrated in a touch screen 720 of FIG. 7B. The extension bar may include a button 721 for expanding the extension bar to the left, a button 722 for expanding the extension bar to the right, and a Create Zoom Window button 723 for changing the extension bar to a zoom window. The shapes, sizes and functions of these buttons are mere examples, and the present disclosure may include all functions for zooming in and displaying texts. The text selected by the zoom window may be highlighted. FIG. 7C illustrates an example of displaying a generated zoom window 731 on a touch screen 730, and the zoom window 731 may include a Move-Left button 732 for moving text to the right to zoom in a left text, and a Move-Right button 733 for moving text to the left to zoom in a right text. The text selected by the zoom window 731 may be highlighted. FIG. 7D illustrates an example of displaying the results obtained when a Move-Left button 742 is selected or entered in a zoom window on a touch screen 740. As the Move-Left button 742 is selected by a finger 741, text may be displayed, which exists on the left compared with the text which is zoomed-in in the zoom window 731 of FIG. 7C. On the contrary, if a Move-Right button 743 is selected by the finger 741, text may be displayed, which exists on the right compared with the text which is zoomed-in in the zoom window 731 of FIG. 7C. FIG. 7E illustrates an example of displaying the results obtained when a Move-Right button 753 is selected or entered in a zoom window on a touch screen 750. As the Move-Right button 753 is selected by a finger 751, text may be displayed, which exists on the right compared with the text which is zoomed-in in the zoom window 731 of FIG. 7C. On the contrary, if a Move-Left button 752 is selected by the finger 751, text may be displayed, which exists on the left compared with the text which is zoomed-in in the zoom window 731 of FIG. 7C.

FIG. 7F illustrates an example of lifting up a zoom window displayed on a touch screen 760. The zoom window may be lifted up as the finger moves from 761 to 762 while the finger touches (or is in contact with) a zoom window 763. Zooming in and displaying text may be achieved in real time in response to movement of the zoom window and the moving zoom window. The zoom window 763 may move in a moving direction of the finger if a touch by the finger continues. FIG. 7G illustrates an example of pulling down a zoom window displayed on a touch screen 770. The zoom window may be pulled down as the finger moves from 771 to 772 while the finger touches (or is in contact with) a zoom window 773. Zooming in and displaying text may be achieved in real time in response to movement of the zoom window and the moving zoom window. The zoom window 773 may move in a moving direction of the finger if a touch by the finger continues.

Figure 8:
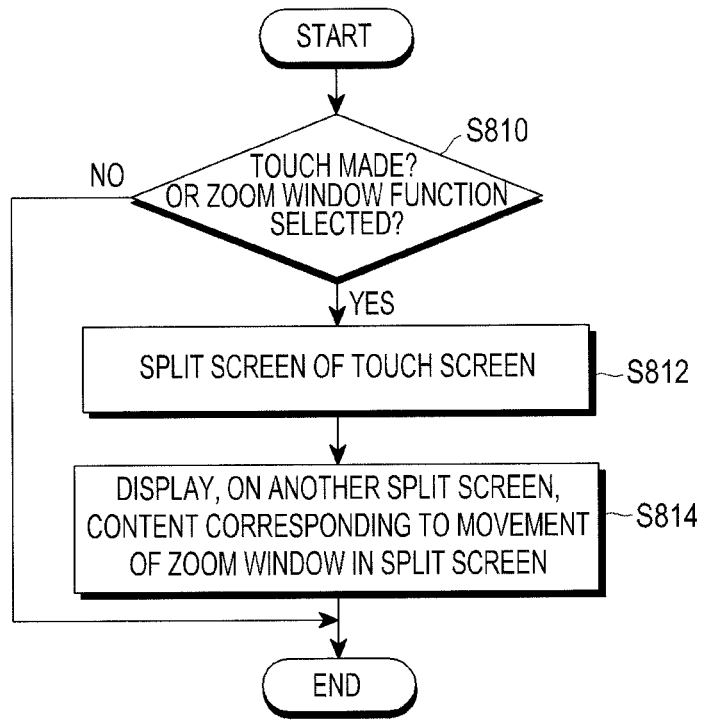
FIG. 8 is a flowchart illustrating a process of controlling display of an object by splitting a screen of a touch screen according to an embodiment of the present disclosure.

FIG. 8 is a flowchart illustrating a process of controlling display of an object by splitting a screen of a touch screen according to an embodiment of the present disclosure, and FIGS. 9A to 9I illustrate a process of controlling display of an object by splitting a screen of a touch screen according to an embodiment of the present disclosure.

Figures 9A, 9B:
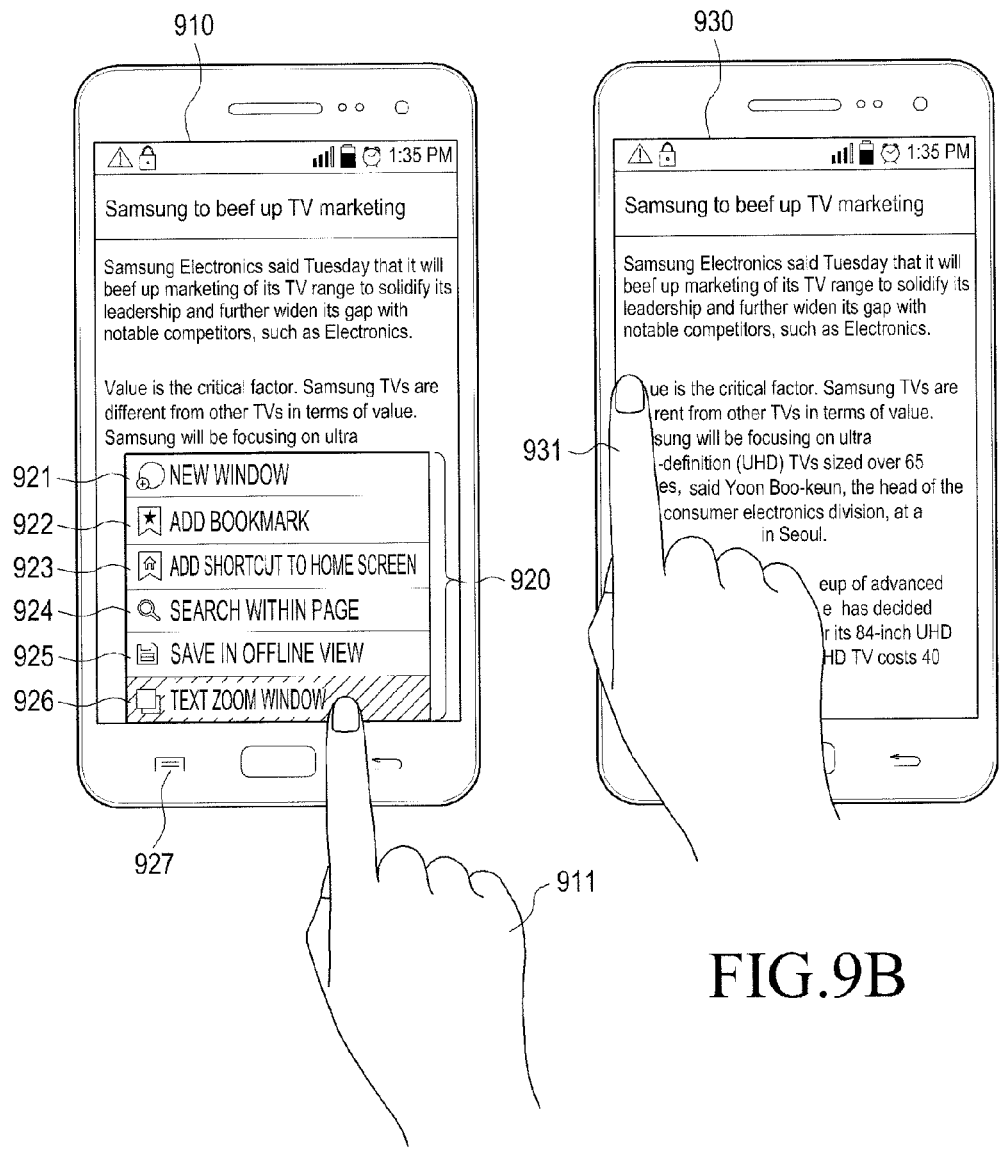
FIG. 9A illustrates an example of executing a menu to split a screen of a touch screen according to an embodiment of the present disclosure.
FIG. 9B illustrates an example of touching a touch screen to split a screen of a touch screen according to an embodiment of the present disclosure.
Figures 9C, 9D:
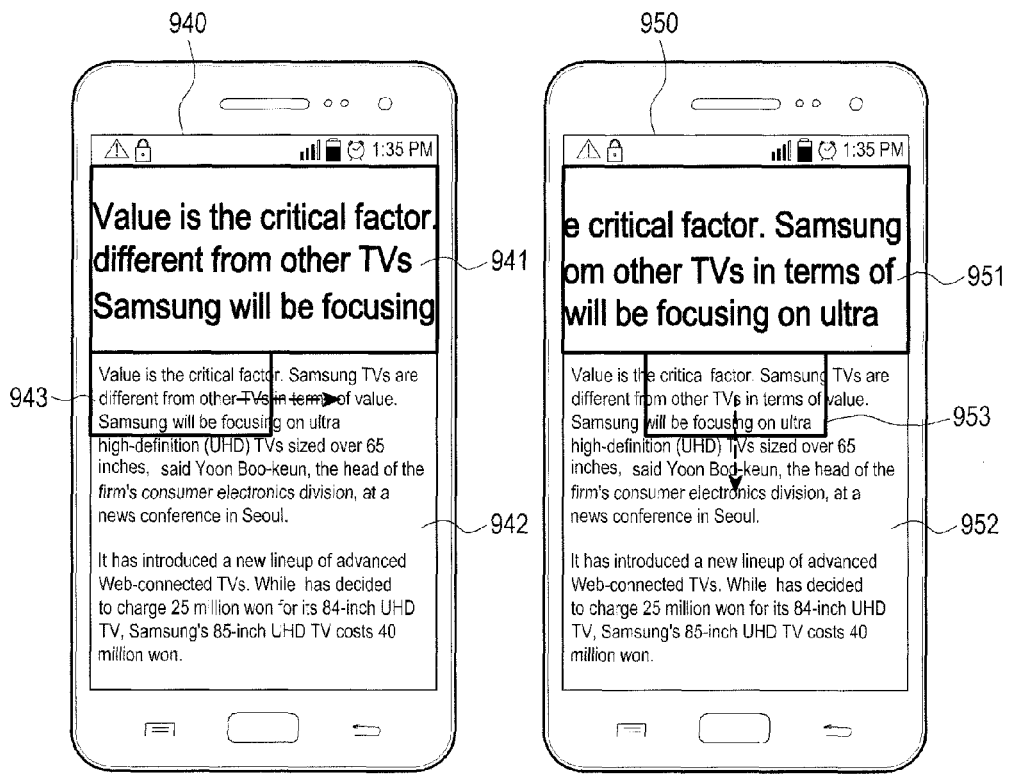
FIG. 9C illustrates an example of splitting a screen of a touch screen according to an embodiment of the present disclosure.
FIG. 9D illustrates an example of moving right a zoom window on a touch screen according to an embodiment of the present disclosure.
Figure 9E:
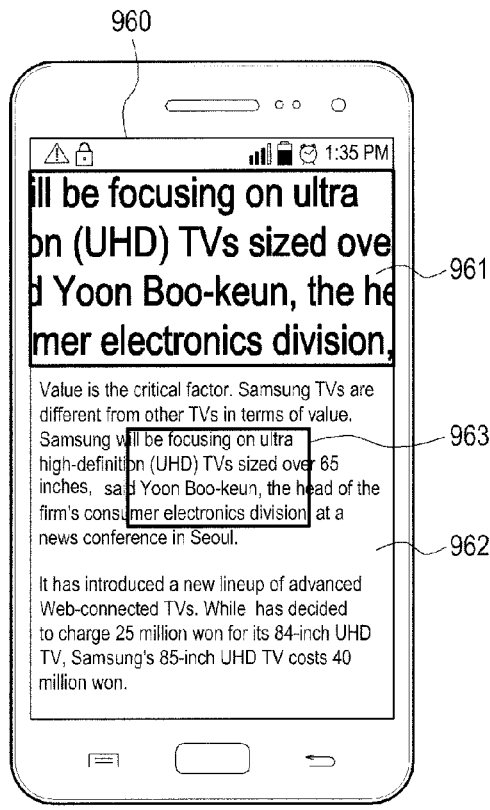
FIG. 9E illustrates an example of moving down a zoom window on a touch screen according to an embodiment of the present disclosure.
Figure 9F:
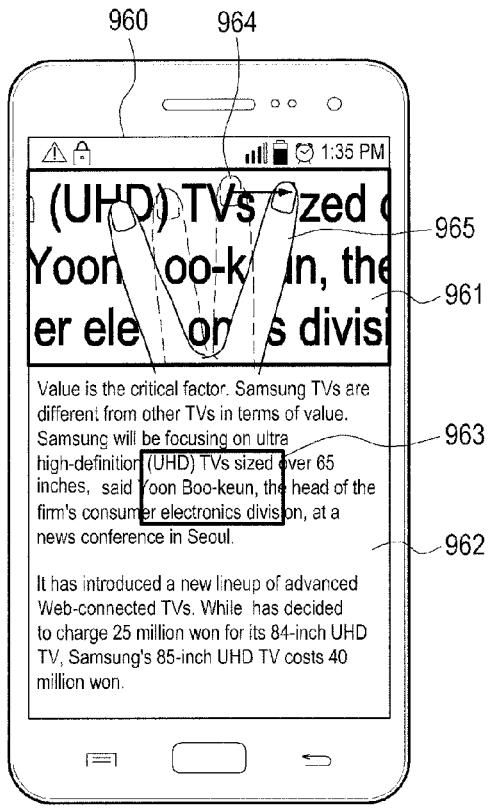
FIG. 9F illustrates an example of making a pinch-to-zoom-in input on a screen of a touch screen according to an embodiment of the present disclosure.
Figures 9G, 9H:
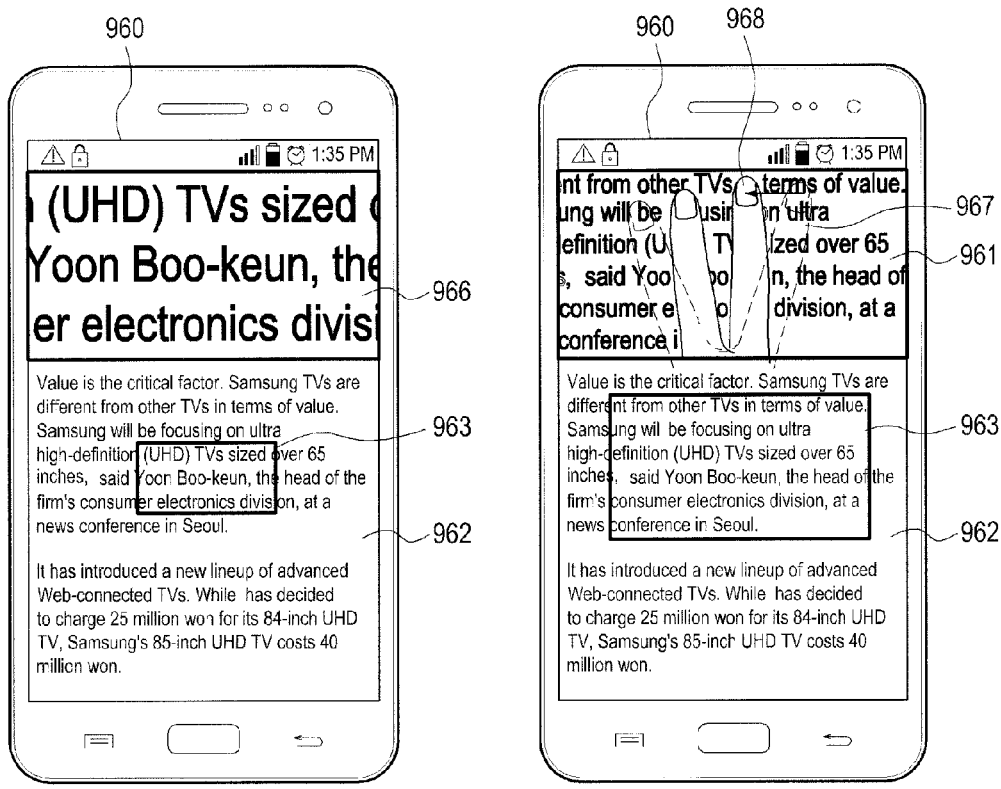
FIG. 9G illustrates an example of results obtained by making a pinch-to-zoom-in input on a screen of a touch screen according to an embodiment of the present disclosure.
FIG. 9H illustrates an example of making a pinch-to-zoom-out input on a screen of a touch screen according to an embodiment of the present disclosure.
Figure 9I:
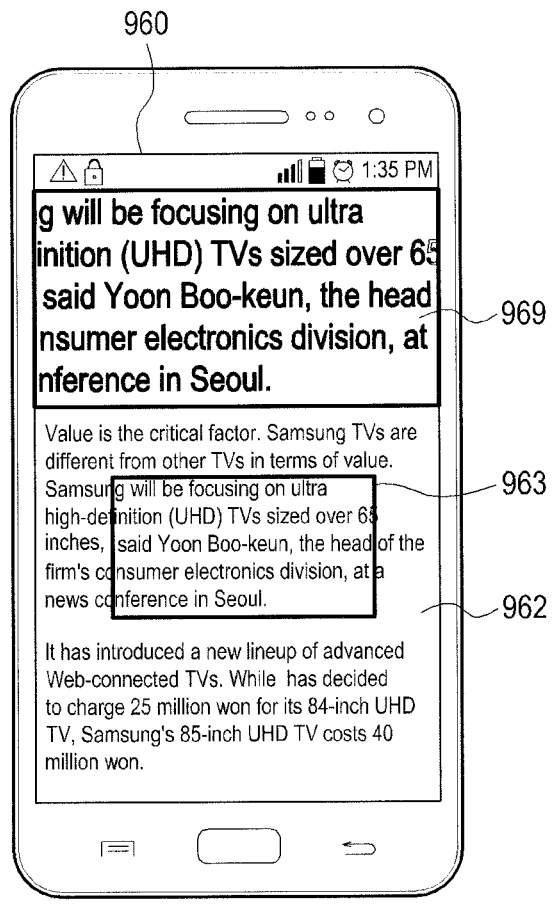
FIG. 9I illustrates an example of results obtained by making a pinch-to-zoom-out input on a screen of a touch screen according to an embodiment of the present disclosure.

Specifically, FIG. 9A illustrates an example of executing a menu to split a screen of a touch screen according to an embodiment of the present disclosure. FIG. 9B illustrates an example of touching a touch screen to split a screen of a touch screen according to an embodiment of the present disclosure. FIG. 9C illustrates an example of splitting a screen of a touch screen according to an embodiment of the present disclosure. FIG. 9D illustrates an example of moving right a zoom window on a touch screen according to an embodiment of the present disclosure. FIG. 9E illustrates an example of moving down a zoom window on a touch screen according to an embodiment of the present disclosure. FIG. 9F illustrates an example of making a pinch-to-zoom-in input on a screen of a touch screen according to an embodiment of the present disclosure. FIG. 9G illustrates an example of results obtained by making a pinch-to-zoom-in input on a screen of a touch screen according to an embodiment of the present disclosure. FIG. 9H illustrates an example of making a pinch-to-zoom-out input on a screen of a touch screen according to an embodiment of the present disclosure. FIG. 9I illustrates an example of results obtained by making a pinch-to-zoom-out input on a screen of a touch screen according to an embodiment of the present disclosure.

Reference will now be made to FIGS. 8 and 9A to 9I to describe in detail a process of controlling display of an object by splitting a screen of a touch screen according to an embodiment of the present disclosure.

If a touch is made on a touch screen for a time period or a zoom window function is selected at operation S810, the controller 110 may split a screen of the touch screen at operation S812. In the present disclosure, the controller 110 may split the touch screen into at least two touch screens in response to at least one of a touch that is detected on the touch screen for a period of time, and selection of the zoom window function. The period of time may be variably adjusted. In addition, the controller 110 may split the screen through a Preferences menu, and each of the split touch screens may be variably resized. For example, if the touch screen is split into upper and lower touch screens, the lower touch screen may be called a first touch screen and the upper touch screen may be called a second touch screen. Each of the touch screens, under control of the controller 110, may be resized, or may display objects. Each of the touch screens may display an object such as a document, a web page and a newspaper article, and on each touch screen may be displayed a zoom window provided to zoom in and display text in the object. Each of the touch screens, under control of the controller 110, may detect a pinch-to-zoom-in input for zooming in a screen, and a pinch-to-zoom-out input for zooming out a screen.

Referring to FIG. 9A, if a Menu button 927 is selected by a finger 911 to split a touch screen while a web page including texts is displayed on a touch screen 910, the controller 110 may display a pop-up window 920 including a plurality of functions that may be applied to the displayed web page. The pop-up window 920 may include a New Window item 921 for displaying a new web page, an Add Bookmark item 922 for adding the displayed web page in a bookmark, an Add Shortcut to Home Screen item 923 for adding a displayed web page to a home screen as a shortcut, a Search within Page item 924 for searching for a desired text within a displayed web page, a Save in Offline View item 925 for saving a displayed web page in an offline view way, and a Text Zoom Window item 926 for zooming in text by splitting a touch screen. Referring to FIG. 9B, even if a touch is made on a touch screen 930 by a finger 931 for a period of time while a web page is displayed on the touch screen 930, the controller 110 may split the touch screen 930.

The controller 110 may display content corresponding to movement of a zoom window in a screen split in operation S812, on another split screen at operation S814. A second touch screen may zoom in and display content in a zoom window on a first touch screen.

Referring to FIG. 9C, a touch screen 940 may be split into a first touch screen 942 and a second touch screen 941. The first touch screen 942 may include a zoom window 943 used to zoom in and view text, and the contents in the zoom window 943 may be displayed on the second touch screen 941. The first touch screen 942 (or the zoom window 943) may be moved by the finger or the input unit 168, and FIG. 9D illustrates a zoom window given by moving right the zoom window 943 in FIG. 9C. Referring to FIG. 9D, a touch screen 950 may be split into a first touch screen 952 and a second touch screen 951. If the user desires to zoom in and view the contents of some texts on the first touch screen 952, on the touch screen 950, the controller 110 may move a zoom window 953 to the contents, and display the contents in the zoom window 953 on the first touch screen 951. FIG. 9E illustrates a zoom window given by moving down the zoom window 953 in FIG. 9D. Referring to FIG. 9E, a touch screen 960 may include a first touch screen 962 and a second touch screen 961 used to zoom in and display contents in a zoom window 963 on the first touch screen 962. As such, the zoom window may freely move up, down, left and right, and the text may be zoomed in and displayed on the second touch screen 961 as the zoom window moves in real time in response to the movement. The zoom may be predetermined, or may be variably adjusted by the user. The touch screen 960 in FIG. 9F may be split into the second touch screen 961 and the first touch screen 962 in which the zoom window 963 is formed. If a pinch-to-zoom-in input is made in response to movement a finger from 964 to 965 on the touch screen 960, the text displayed on the second touch screen 961 may be zoomed in. The zoom window 963 on the first touch screen 962 may be zoomed out in response to the zoom-in of the text displayed on the second touch screen 961. For example, as to the second touch screen 961 in FIG. 9E, if a pinch-to-zoom-in input is made on the second touch screen 961 as illustrated in FIG. 9F, the controller 110 may zoom in the text displayed on the second touch screen 961 in FIG. 9E, and display the second touch screen 961 as illustrated in FIG. 9F. In response, the zoom window 963 on the first touch screen 962 in FIG. 9E may be zoomed out like a zoom window 963 on the first touch screen 962 in FIG. 9F. The text displayed in the zoom window 963 in FIG. 9F may be displayed on the second touch screen 961 in FIG. 9F. FIG. 9G illustrates the results obtained after the pinch-to-zoom-in input shown in FIG. 9F is made. As illustrated, the touch screen 960 in FIG. 9G may display the contents in the zoom window 963 on the first touch screen 962, on a second touch screen 966. FIG. 9H illustrates a process of making a pinch-to-zoom-out input on a second touch screen in FIG. 9E. The text displayed on the second touch screen 961 may be zoomed out in response to movement of a finger from 967 to 968 on the second touch screen 961 in FIG. 9H. At the same time, the zoom window 963 on the first touch screen 962 in FIG. 9H may be zoomed in.

For example, as to the second touch screen 966 in FIG. 9G, if a pinch-to-zoom-out input is made on the second touch screen 961 as illustrated in FIG. 9H, the controller 110 may zoom out the text displayed on the second touch screen 966 in FIG. 9G, and display the second touch screen 961 as illustrated in FIG. 9H. In response, the zoom window 963 on the first touch screen 962 in FIG. 9G may be zoomed in like a zoom window 963 on the first touch screen 962 in FIG. 9H. The text displayed in the zoom window 963 in FIG. 9H may be displayed on the second touch screen 961 in FIG. 9H. FIG. 9I illustrates the results obtained after the pinch-to-zoom-out input shown in FIG. 9H is made. As illustrated, the touch screen 960 in FIG. 9I may display the contents in the zoom window 963 on the first touch screen 962, on a second touch screen 969.

It may be appreciated that various embodiments of the present disclosure may be implemented by hardware, software or a combination thereof. The software may be stored in volatile or non-volatile storage unit (e.g., erasable/rewritable ROM), memory (e.g., RAM, memory chip, memory device, or memory Integrated Circuit (IC)), or optically/magnetically recordable machine (e.g., computer)-readable storage media (e.g., Compact Disk (CD), Digital Versatile Disk (DVD), magnetic disk, or magnetic tape). A memory that may be mounted in the mobile terminal may be an example of machine-readable storage media suitable to store a program or programs including instructions for implementing various embodiments of the present disclosure. Therefore, the mobile terminal according to the present disclosure may include a program including codes for implementing the apparatus and method defined by the appended claims, and machine-readable storage media storing the program.

The mobile terminal may receive and store the program from a program server to which the mobile terminal is connected by wires or wirelessly. The program server may include a memory for storing a program including instructions for allowing the mobile terminal to perform the method for controlling display of an object, and for storing information needed for the method for controlling display of an object, a communication unit for performing wired or wireless communication with the mobile terminal, and a controller for transmitting the program to the mobile terminal at the request of the mobile terminal or automatically.

As is apparent from the foregoing description, the mobile terminal equipped with at least one touch screen may partially zoom in an object to improve the accessibility of low-vision users, thereby allowing the users to freely adjust the screen. In addition, the mobile terminal may split a touch screen into a plurality of touch screens, and zoom in and display text in an object on one split screen to increase the user's readability, allowing the user to determine the position at which the user is presently reading in the zoomed-in web page.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling display of an object displayed on a touch screen in an electronic terminal, the method comprising:
    displaying the object including text on the touch screen of the electronic device;
    displaying an extension bar for selecting the text and a zoom button for displaying a zoom window, in response to a first touch input that is detected on the touch screen of the electronic device for a period of time; and
    if a second touch input is detected on the zoom button, displaying the zoom window for displaying enlarged text corresponding to the text on the zoom window.

2. The method of claim 1, wherein the zoom window includes at least one move button comprising a move-up button, a move-down button, a move-left button and a move-right button, and the text of the object is zoomed in and displayed in response to a touch input on the at least one move button.

3. The method of claim 1, wherein the extension bar is resized in at least one of up, down, left and right directions.

4. The method of claim 1, wherein the zoom window is used to zoom in and display the text of the object in a fixed position in response to movement by a touch input of an object displayed on the touch screen.

5. The method of claim 1, wherein the zoom window is moved along with movement by a touch input of an object displayed on the touch screen.

6. The method of claim 1, wherein, if a touch input is detected on the displayed object in a portion other than the zoom window for a period of time, the zoom window moves to a point of the detected touch input and displays zoomed-in the text of the object.

7. The method of claim 1, wherein, if a touch input is made in a portion other than the extension bar and the zoom window, the extension bar and the zoom window are released.

8. The method of claim 1, wherein the zoom is variable.

9. An electronic device for controlling display of an object displayed on a touch screen, the electronic device comprising:
    the touch screen configured to display the object including text; and
    at least one processor configured to:
        display, on the touch screen, an extension bar for selecting the text and a zoom button for displaying a zoom window, in response to a first touch input that is detected on the touch screen for a period of time, and
        if a second touch input is detected on the zoom button, display, on the touch screen, the zoom window for displaying enlarged text corresponding to the text on the zoom window.

10. The electronic device of claim 9,
    wherein the generated zoom window includes at least one move button of a move-up button, a move-down button, a move-left button and a move-right button, and
    wherein the at least one processor is further configured to zoom in and display the text of the object in response to a touch on the at least one move button.

11. The electronic device of claim 9, wherein the extension bar is resized in at least one of up, down, left and right directions.

12. The electronic device of claim 9, wherein the at least one processor is further configured to:
    zoom in on the text of the object in a fixed position, and display the zoomed-in the text of the object in the zoom window in response to movement by a touch input of an object displayed on the touch screen.

13. The electronic device of claim 9, wherein the at least one processor is further configured to control movement of the zoom window along with movement by a touch input of an object displayed on the touch screen.

14. The electronic device of claim 9, wherein, if a touch input is detected on the displayed object in a portion other than the zoom window for a period of time, the at least one processor is further configured to:
move the zoom window to a point of the detected touch input, and
zoom in and display the text of the object in response to the movement of the zoom window.

15. The electronic device of claim 9, wherein the at least one processor is further configured to release the extension bar and the zoom window in response to a touch input that is made in a portion other than the extension bar and the zoom window.

16. The method of claim 1, further comprising:
displaying a first screen and a second screen by splitting the touch screen in response to the touch input, and selection of a zoom window function; and
displaying enlarged contents corresponding to contents in a zoom window on the first screen, on the second screen.

17. The method of claim 16, wherein the second screen is used to zoom in and display the content corresponding to a zoom window in response to movement of the zoom window in at least one of up, down, left and right directions.

18. The method of claim 16, wherein the zoom window on the first screen is reduced in size in response to a pinch-to-zoom-in input on the second screen.

19. The method of claim 16, wherein the zoom window on the first screen is enlarged in size in response to a pinch-to-zoom-out input on the second screen.

20. The method of claim 16, wherein the second screen is used to zoom in and display content in the zoom window.

21. The method of claim 16, wherein content corresponding to a moving direction of a drag by a touch input on the second screen is displayed in the zoom window.

22. The method of claim 16, further comprising converting the first screen into a keypad if a text window is selected on at least one of the first screen and the second screen.

23. The electronic device of claim 9, wherein the at least one processor is further configured to:
display a first screen and second screen by splitting the touch screen in response to the touch input,
select a zoom window function, and
display enlarged contents corresponding to contents in a zoom window on a first screen, on a second screen.

24. The electronic device of claim 23, wherein the at least one processor is further configured to zoom in and display content on the second screen in response to movement of the zoom window in at least one of up, down, left and right directions.

25. The electronic device of claim 23, wherein the at least one processor is further configured to reduce a size of the zoom window on the first screen upon detecting a pinch-to-zoom-in input on the second screen.

26. The electronic device of claim 23, wherein the at least one processor is further configured to enlarge a size of the zoom window on the first screen upon detecting a pinch-to-zoom-out input on the second screen.

27. The electronic device of claim 23, wherein the second screen is used to zoom in and display content in the zoom window.

28. The electronic device of claim 23, wherein the at least one processor is further configured to display, in the zoom window, content corresponding to a moving direction of a drag by a touch input on the second screen.

29. The electronic device of claim 23, wherein the at least one processor is further configured to convert at least one of the first screen and the second screen into a keypad, if a text window is selected on at least one of the first screen and the second screen.

30. The electronic device of claim 23, wherein the touch screen is split into the first screen and the second screen if the zoom window function is selected.

31. The electronic device of claim 23, wherein each of the first screen and the second screen is variably resized.

32. The electronic device of claim 29,
wherein the first screen detects one of a pinch-to-zoom-in and a pinch-to-zoom-out and alters magnification of the content of the first screen in correspondence to a movement of the one of the pinch-to-zoom-in and the pinch-to-zoom-out, and
wherein a size of the second screen changes in inverse proportion to the magnification of the content of the first screen.

* * * * *